US012585643B2

(12) United States Patent
Kirk

(10) Patent No.: US 12,585,643 B2
(45) Date of Patent: Mar. 24, 2026

(54) GENERATED CONTENT SOURCE ATTRIBUTION

(71) Applicant: Salesforce, Inc., San Francisco, CA (US)

(72) Inventor: Dustin Allen Kirk, San Diego, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/488,544

(22) Filed: Oct. 17, 2023

(65) Prior Publication Data

US 2025/0124024 A1 Apr. 17, 2025

(51) Int. Cl.
G06F 16/242 (2019.01)
G06F 16/248 (2019.01)
G06F 21/60 (2013.01)

(52) U.S. Cl.
CPC .......... G06F 16/243 (2019.01); G06F 16/248 (2019.01); G06F 21/602 (2013.01)

(58) Field of Classification Search
None
See application file for complete search history.

(56) References Cited

U.S. PATENT DOCUMENTS

| | | | |
|---|---|---|---|
| 2021/0149886 A1* | 5/2021 | Zheng ..................... | G06N 5/02 |
| 2022/0121656 A1* | 4/2022 | Zheng .............. | G06F 18/24133 |
| 2022/0277738 A1* | 9/2022 | Aher ..................... | G06N 20/00 |
| 2024/0037163 A1* | 2/2024 | Parker .................... | G06F 9/451 |
| 2024/0281472 A1* | 8/2024 | LaRhette ............. | G06F 16/248 |
| 2024/0281487 A1* | 8/2024 | Bathwal ............. | G06F 16/9558 |
| 2024/0289407 A1* | 8/2024 | Rofouei ............. | G06F 16/9577 |
| 2024/0289861 A1* | 8/2024 | Wang ................ | G06Q 30/0643 |
| 2024/0311563 A1* | 9/2024 | Somech ............... | G06F 40/279 |
| 2024/0394251 A1* | 11/2024 | Brende .............. | G06F 11/3409 |

* cited by examiner

*Primary Examiner* — Sanjiv Shah
*Assistant Examiner* — Navneet Gmahl
(74) *Attorney, Agent, or Firm* — Holland & Hart, LLP.

(57) ABSTRACT

A large language model (LLM) may receive a query via a user interface of a client device. The LLM may generate one or more data queries from the query to query one or more data sets. The LLM may then transmit the one or more data queries to the one or more data sets. The LLM may then receive information associated with the query and a source for the information from the one or more data sets. The source may be indicative of a location within the one or more data sets from where the information was obtained. Following, the LLM may generate a response to the query that includes the information associated with the query and the source for the information and transmit the response to the user interface of the client device for display.

17 Claims, 10 Drawing Sheets

110-a 130-a 110-b 130-b 105-a 105-b 130-c 110-c 130-d 105-c

135

110-d

Data Center

120

140

Cloud Platform

115

125

100

225     230

| Parsing Service | Query Formulation Service |
|---|---|

235

Response Construction Service

205

210 Query 215

| User Interface |
|---|

Large Language Model

220   Data Queries 240

245

| Data Sets |
|---|

Response 265

Data Query Responses 260

250     255

| Internal Data Set Connector | External Data Set Connector |
|---|---|

200

305

User
Interface

310

Large
Language
Model

315

Data Sets

320

Query

325

Parse Query

330

Generate Data
Queries

335

Data Queries

Information from
Data Sets

340

345

Generate
Response

350

Response to Query

300

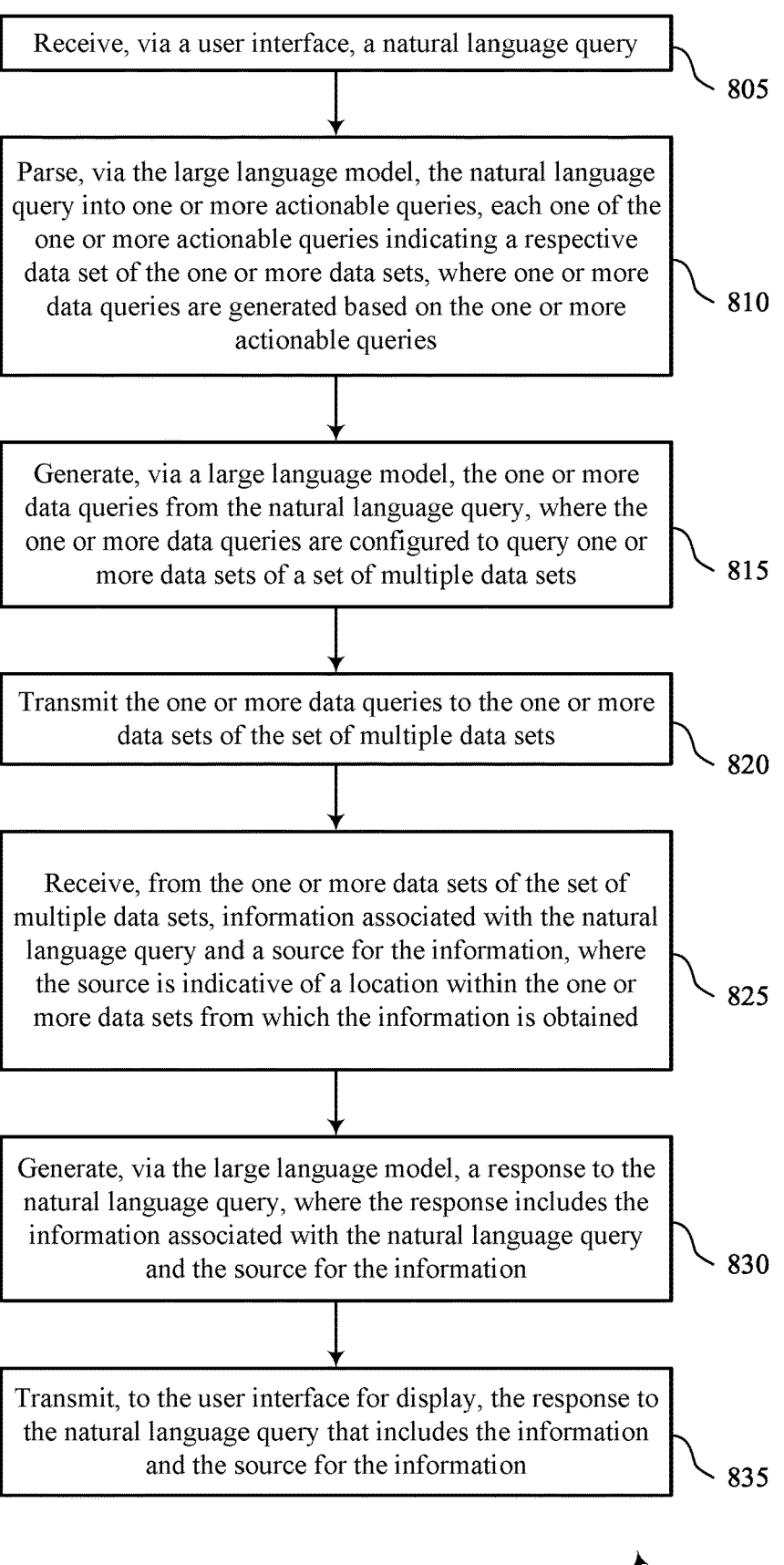

Receive, via a user interface, a natural language query

805

Parse, via the large language model, the natural language query into one or more actionable queries, each one of the one or more actionable queries indicating a respective data set of the one or more data sets, where one or more data queries are generated based on the one or more actionable queries

810

Generate, via a large language model, the one or more data queries from the natural language query, where the one or more data queries are configured to query one or more data sets of a set of multiple data sets

815

Transmit the one or more data queries to the one or more data sets of the set of multiple data sets

820

Receive, from the one or more data sets of the set of multiple data sets, information associated with the natural language query and a source for the information, where the source is indicative of a location within the one or more data sets from which the information is obtained

825

Generate, via the large language model, a response to the natural language query, where the response includes the information associated with the natural language query and the source for the information

830

Transmit, to the user interface for display, the response to the natural language query that includes the information and the source for the information

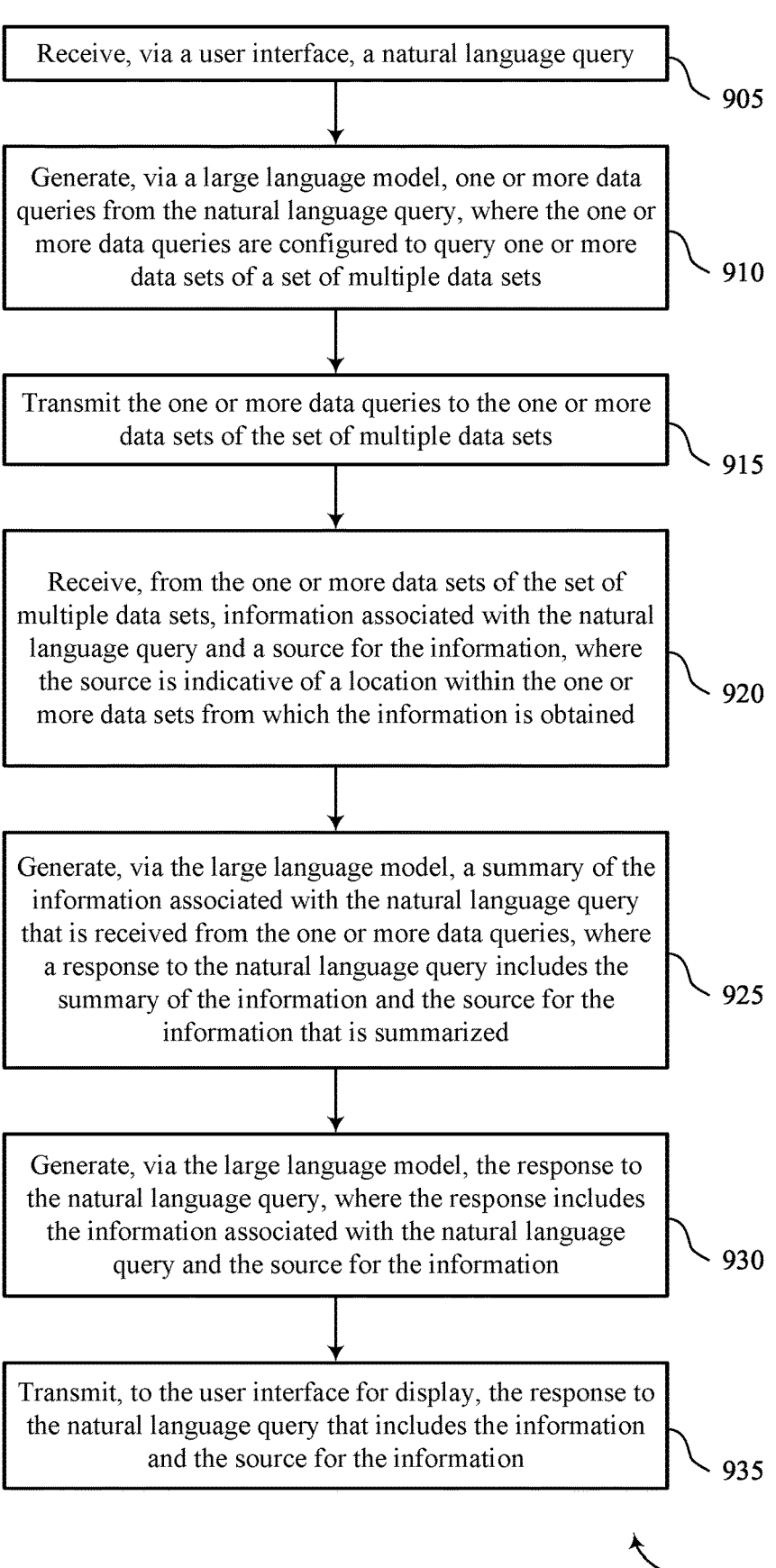

Receive, via a user interface, a natural language query

905

Generate, via a large language model, one or more data queries from the natural language query, where the one or more data queries are configured to query one or more data sets of a set of multiple data sets

910

Transmit the one or more data queries to the one or more data sets of the set of multiple data sets

915

Receive, from the one or more data sets of the set of multiple data sets, information associated with the natural language query and a source for the information, where the source is indicative of a location within the one or more data sets from which the information is obtained

920

Generate, via the large language model, a summary of the information associated with the natural language query that is received from the one or more data queries, where a response to the natural language query includes the summary of the information and the source for the information that is summarized

925

Generate, via the large language model, the response to the natural language query, where the response includes the information associated with the natural language query and the source for the information

930

Transmit, to the user interface for display, the response to the natural language query that includes the information and the source for the information

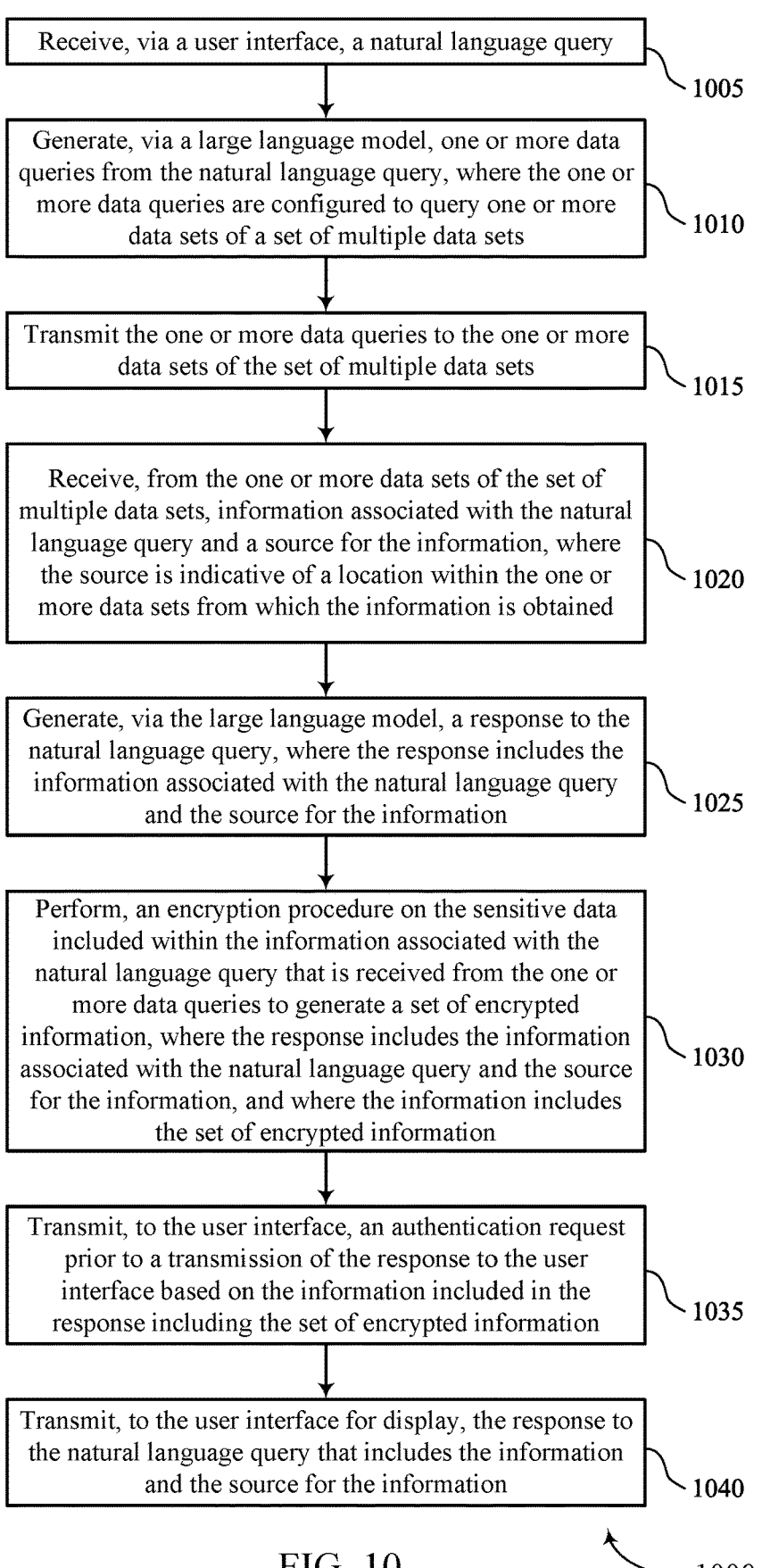

Receive, via a user interface, a natural language query

1005

Generate, via a large language model, one or more data queries from the natural language query, where the one or more data queries are configured to query one or more data sets of a set of multiple data sets

1010

Transmit the one or more data queries to the one or more data sets of the set of multiple data sets

1015

Receive, from the one or more data sets of the set of multiple data sets, information associated with the natural language query and a source for the information, where the source is indicative of a location within the one or more data sets from which the information is obtained

1020

Generate, via the large language model, a response to the natural language query, where the response includes the information associated with the natural language query and the source for the information

1025

Perform, an encryption procedure on the sensitive data included within the information associated with the natural language query that is received from the one or more data queries to generate a set of encrypted information, where the response includes the information associated with the natural language query and the source for the information, and where the information includes the set of encrypted information

1030

Transmit, to the user interface, an authentication request prior to a transmission of the response to the user interface based on the information included in the response including the set of encrypted information

1035

Transmit, to the user interface for display, the response to the natural language query that includes the information and the source for the information

GENERATED CONTENT SOURCE ATTRIBUTION

FIELD OF TECHNOLOGY

The present disclosure relates generally to database systems and data processing, and more specifically to generated content source attribution.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Generative artificial intelligence (AI) systems may assist users in responding to queries in a natural language format using machine learning (ML) models such as a large language model (LLM). LLMs may be trained on a large corpus of text data and may be able to process large amounts of text data. As such, an LLM may be capable of respond to natural language queries from users allowing users to utilize such AI systems without the knowledge or technical experience expected to prompt model to generate a helpful and appropriate output. However, in some examples, LLMs may receive information from multiple sources making it difficult for users to determine the origin or source of the details given in a response to a natural language query. Additionally, or alternatively, some details or information in the response may be directly sourced from a data set, inferred by the AI system, or both. Thus, a user may be unable to identify whether the information was sourced directly or inferred by the AI system, therefore enhance the uncertainty and trust in such AI systems.

BRIEF DESCRIPTION OF THE DRAWINGS

FIGS. 7 through 10 show flowcharts illustrating methods that support generated content source attribution in accordance with aspects of the present disclosure.

DETAILED DESCRIPTION

Figure 1:
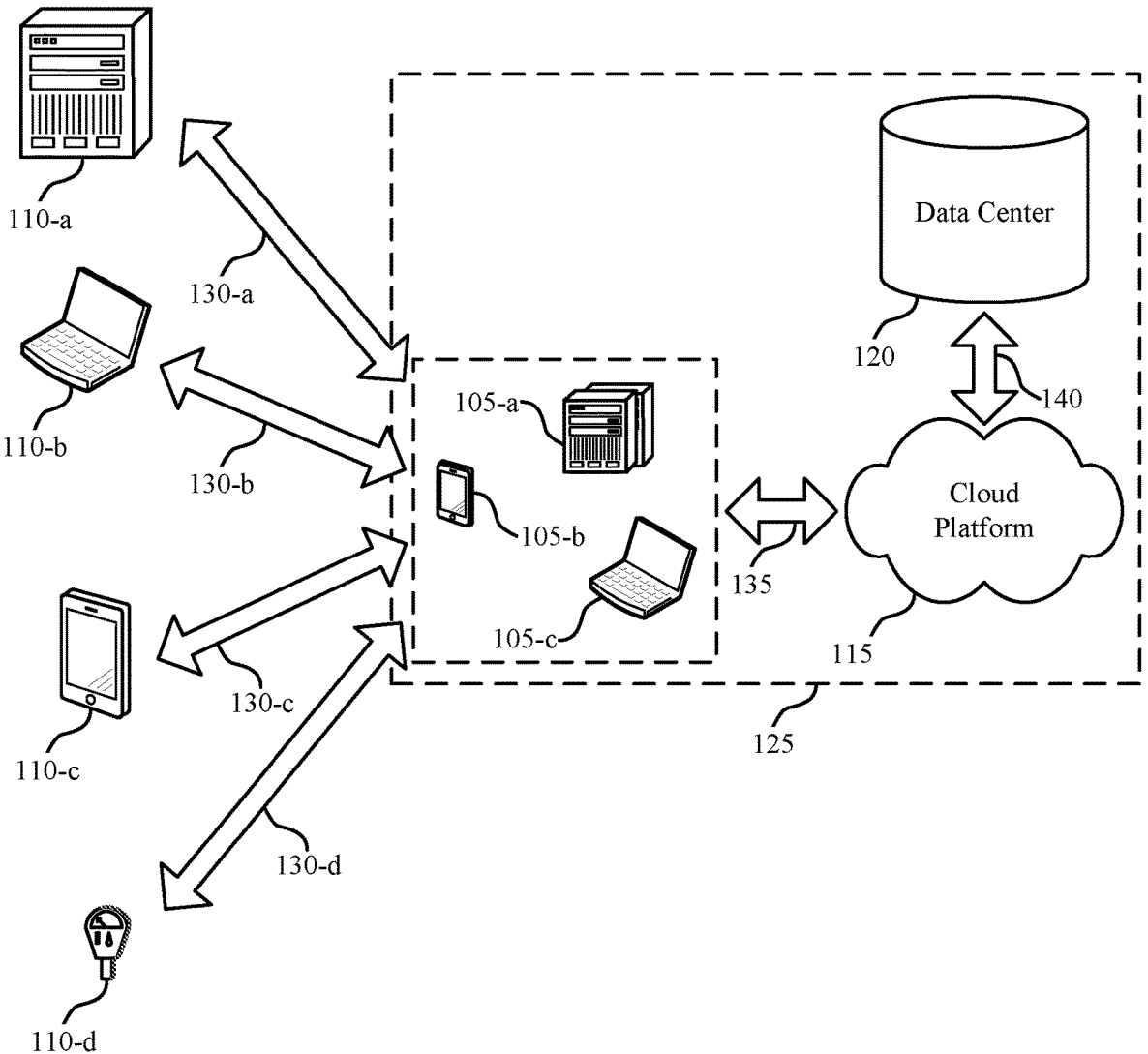
FIG. 1 illustrates an example of a data processing system that supports generated content source attribution in accordance with aspects of the present disclosure.

Some artificial intelligence (AI) systems may include generative AI systems. Such generative AI systems may include machine learning (ML) models which may include large language models (LLMs) or similar models capable of generating text, images, computer code, or the like. LLMs may be a type of ML model using an AI system (e.g., a generative AI system) to process a relatively large quantity of text data, images, videos, or any combination thereof. In some examples, a corpus of data (e.g., a relatively large set) may be given to the LLM as training data, the AI system of the LLM may perform web-scraping to extract large amounts of data from the internet, and/or a small amount of data may be given to the LLM as training data to instruct the AI system of type of data the AI system should extract via web-scraping techniques. The data may be stored within a database system or unstructured data storage. In some cases, the data may then be accessed by the LLM to perform text-based predictions. In some examples, LLMs may assist users in responding to queries in a natural language format. As such, the LLM may use the corpus of text data used to train the LLM to respond to queries from users or other systems (e.g., natural language queries, pre-defined queries, visual inputs, or other input modalities). A natural language query may be an example of a query that is in a format similar to everyday language (e.g., colloquial language). Using the such queries, users or systems may be able to prompt LLMs without the knowledge or technical experience expected to prompt the LLM to generate a helpful and appropriate output. When generating responses, LLMs may receive or utilize information from multiple sources (e.g., multiple data sets, data repositories, or databases). Therefore, determining the origin or source of the information given in a response to a query may be difficult for a user to perform. Additionally, or alternatively, some details or information in the response may be directly sourced or may be inferred by the LLM. As such, the user may be unable to identify the source of the information in the response to a query which may enhance the uncertainty and decrease the trust in such AI systems using the LLM.

To enhance the trust in LLMs used in AI systems, techniques described herein support the LLMs including a source for the information within the response. For example, an LLM may receive a natural language query from a user via a user interface. The LLM may then transform the natural language query into one or more data queries to query one or more data sets connected to the LLM. Based on generating such data queries and transmitting the data queries to the respective data sets, the LLM may receive information from the data queries that may be associated with the natural language query and receive the source of the information. For example, the source in the response from a data query to a data set may include a location within the data set which the information may be obtained from. Using the information and sources received from the data queries, the LLM may generate and transmit a response to the natural language query that includes the information associated with the natural language query and the source for the information to the user interface for display to the user. As such, users may be able to view where the information in the response was obtained and how the information was generated. Therefore, users may be capable of validating the information manually which may enhance the level of trust in the LLMs therefore allowing more users to use LLMs which may additionally enhance the effectiveness of the LLMs as LLMs learn and improve over time based on the quantity of prompts given over time.

In some examples, the information provided in the response may be generated or inferred by the AI system of the LLM. That is, the AI system may use the responses from the one or more data queries to generate or infer information to be included in a response to a query (e.g., a natural language query, a pre-defined query, a visual input, or any combination thereof). In such examples, the LLM may include that the source of the information within the response may be the AI system (e.g., the source indicates that the AI system generated the information included in the response). In some cases, the LLM may also include the sources (e.g., the locations within the data sets) of the information used by the AI system to generate or infer the information included in the response. As such, the user may be capable of understanding how the information in the response was generated.

In some other examples, to generate the data queries the LLM may parse a query (e.g., a natural language query) into one or more actionable queries that indicate which data set to query and the information to obtain from the data set. That is, the LLM may parse the contents of the natural language query to identify the information that should be obtained and which data sets the information should be obtained from. Therefore, using such information, the LLM may be capable of generating the one or more data queries to receive the information associated with the natural language query. Further, the data sets queried by the LLM may be examples of internal data sets or external data sets which may be described elsewhere herein. Additionally, or alternatively, the LLM may generate the response to the natural language query such that the source may be displayed via the user interface as footnotes, hyperlinks, in-line citations, or any combination thereof.

Aspects of the disclosure are initially described in the context of an environment supporting an on-demand database service. Additional aspects of the disclosure are described herein with reference to a computing system and a process flow. Aspects of the disclosure are further illustrated by and described with reference to apparatus diagrams, system diagrams, and flowcharts that relate to generated content source attribution.

FIG. 1 illustrates an example of a system 100 for cloud computing that supports generated content source attribution in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may implement or support AI systems which may include generative AI systems that include LLMs. For example, a user may transmit a query using a user interface of a cloud client 105 or contact

110. In some examples, the LLM may be hosted on a contact 110 or on a cloud client 105 via the cloud platform 115. Further, when hosted on the cloud platform 115 the LLM may be connected with the data center 120 which may be an example of an internal data set or an external data set as described elsewhere herein. As such, the AI system that includes the LLM may be used by cloud clients 105 or contacts 110 of the system 100.

Within the system 100, users of contacts 110, cloud clients 105, or both, may transmit queries to an LLM (e.g., natural language queries, pre-defined queries, visual inputs, or other query input modalities). Traditionally, the LLM may generate a response based on training information from one or more data sets or based on information received at the LLM or accessible by the LLM. The response may then be transmitted to a to a user. In some examples, the LLM may use the information obtained from the one or more data sets to generate (e.g., infer) the information included in the response. However, using such techniques, a user may be unable to determine how the LLM sourced the information included in the response, or if the AI system of the LLM inferred the information based on the information obtained from the one or more data sets. As such, the user may be unable to determine or trust if the information in the response is correct or accurate or whether the LLM generated a "hallucination."

As such, to ensure that users may be able to trust the information included in the response, techniques described herein support the LLM including the source for the information in the response. The source may be indicative of a location within the data sets connected to the LLM that the LLM obtained the information from. To be capable of determining the source of the information, the LLM may be configured to generate one or more data queries based on the query. That is, the LLM may parse the query to determine which data sets the LLM should query and the information that the LLM should obtain from a respective data set. As such, as part of a data query, the LLM may request the data set to respond with the information associated with a respective data query and a location within the data set that the information or data is located. For example, if the data set is database, the data query may return the location within the database that the data requested by the data query may be located. Therefore, the LLM may receive responses from the one or more data queries and be capable of indicating that a piece of information is from a specific data set (e.g., based on the data set a data query had queried) and the location within the data set the information is from. Using such source information, the LLM may then generate a response to the query that includes the information associated with the query (e.g., the information obtained from the one or more data queries) and the source for the information. As such, if needed, a user may be able to use the indicated source information to verify the accuracy of the generated response when the AI system infers the information or a portion of the information of the response. Therefore, the techniques of the present disclosure described herein may enable users to receive the source for information included in a LLM generated response to a query provided by a user or another system or device.

For example, a sales representative may use the AI system and the corresponding LLM of the system 100 to generate a customized sales proposal for a client (e.g., a tenant of a multi-tenant database system). To generate the customized sales proposal, the LLM may be retrieve information related to the tenant from the multi-tenant database system, a CRM, previous emails between the sales representative and the client, and external databases. Such information may be examples of data within internal data sets (e.g., data sets that the LLM has direct access to) or data from external data sets (e.g., data sets that the LLM may have access to via various connections). The LLM of the system 100 may then generate the customized sales proposal while clearly annotating from where the data included in the sales proposal is obtained. For example, the LLM may infer or predict a sales target for the next year and include the predicted sales target in the response. Such predicted sales target may be annotated with the information used to generate such prediction. For example, the LLM may use historical sales data included in the multi-tenant database system and data from conversations between the sales representative and the client. As such, the sales representative may be able to determine if such data is accurate by manually checking the data used by the LLM. Further, the client may be able to understand how the sales representative generated such prediction which may enhance the trust in the response and result in enhanced relations with the sales representative. Such descriptions of other use cases and techniques to include the source of information included in an LLM generated response may be described elsewhere herein, including with reference to FIGS. 2 and 3.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
FIG. 2 shows an example of a computing system that supports generated content source attribution in accordance with aspects of the present disclosure.

FIG. 2 shows an example of a computing system 200 that supports generated content source attribution in accordance with aspects of the present disclosure. In some examples, the computing system 200 may be implemented by or may implement the system 100. For example, the computing system 200 may include a client device 205 associated with a user interface 210, an LLM 220 that includes a parsing service 225, a query formulation service 230, and a response construction service 235, and data sets 245 which may be connected via an internal data set connector 250 and an external data set connector 255. Aspects of the computing system 200 may be supported by aspects of FIG. 1. For example, the LLM 220 may be supported or accessed by a cloud platform 115 of FIG. 1, and the data sets 245 may be an example of aspects of the data center 120 of FIG. 1.

In some examples, the computing system 200 may include an AI system that uses the LLM 220. Further, the AI system using the LLM 220 may be an example of a generative AI system. Generative AI may be a form of AI that may be capable of generating content (e.g., text, images, code, or any combination thereof) in response to user prompts in a natural language format. In some examples, the user prompts may be natural language queries (e.g., a natural language query 215). As described herein, a natural language query may be an example of a query that is in a format similar to everyday language (e.g., colloquial language). As such, a user may be able to use an AI system (e.g., the LLM 220) without the experience or technical knowledge of AI systems.

Therefore, a user may use the user interface 210 of the client device 205 to transmit a query 215 (e.g., a natural language query, a pre-defined query, a visual input, or any combination thereof) to the LLM 220. In some examples, the user interface 210 may be a front-end component available to a user to input requests and queries 215. Further, the user interface 210 may be part of a web-based application (e.g., a website), a mobile application, or integrated within a software. For example, the user interface 210 of the client device 205 may be implemented with an existing LLM 220. Using the request or query 215 from the user interface 210 of the client device 205, the LLM 220 may then communicate with the data sets 245 connected to the LLM 220 to receive information associated with the query 215. As such, the LLM 220 may generate a response 265 to the query 215 and transmit the response 265 to the user interface 210 of the client device 205. In some examples, the LLM 220 may generate the response 265 in a natural language format such that the query 215 may be answered by the information of the response 265. Further, the LLM 220 may generate the response 265 using data or information from a collection of or a combination of data sets 245 (e.g., internal data sets 245 and external data sets 245). Additionally, or alternatively, the LLM 220 may generate the response 265 that includes an inference related to the data obtained from the data sets 245. As such, the LLM 220 may integrate data from various sources (e.g., various data sets 245) to generate the response 265 for a user of the client device 205.

In some examples, when a user receives the response 265 to the query 215 via the user interface 210 of the client device 205, the user may analyze the information within the response 265. In some examples, since the LLM 220 may include data from multiple data sets 245 and inferences from data obtained from the multiple data sets 245 within the response 265, the user may be unable to determine the origins of the information within the response 265. For example, the data sets 245 may include internal data sets 245 such as personal records from a database, communication (e.g., text messages, emails) threads, or external data sets 245 such as external databases. As such, users may be unable to determine which data sets 245 the LLM 220 may use to generate the response 265 (e.g., which data sets 245 the LLM 220 obtained information or data from to generate the response 265). Additionally, or alternatively, the LLM 220 may paraphrase (e.g., reword or reformat) or summarize the information or data obtained from the data sets 245 when generating the response 265 introducing some additional ambiguity of from where the LLM obtained information of the response 265. Further, as described herein, the LLM 220 may include an inference or prediction within the response 265 that the LLM 220 may generate using the data obtained from the data sets 245 associated with the query 215.

As such, due to users being unable to determine or identify a source for the information included within the response 265 from the LLM 220, users may have an innate distrust in the LLM 220. For example, if a user wishes to determine where the information within the response 265 may be from (e.g., the source of the information within the response 265), the user may have to perform extensive searches on the data sets 245 to determine the source of the information within the response 265. Further, since the LLM 220 may generate, paraphrase, or summarize, some information within the response 265, the user may be unable to determine the source of the information used to generate the information within the response 265. Additionally, or alternatively, the data sets 245 may include sensitive information or sensitive data and the users may be unable to determine how the sensitive data may be managed and used by the LLM 220 when generating the response 265 which may result is security issues and concerns. As such, the LLM 220 may not support users being capable of understanding the sources of the information included in the response 265 and how the LLM 220 generates information included in the response 265. In some examples, there may be AI systems (e.g., AI writing assistants) that may provide based citation and reference-list capabilities. However, such systems may simply provide links to external sources (e.g., external data sets 245) and may lack the integration, flexibility, and domain-specific customization described with reference to the techniques of the present disclosure elsewhere herein. In some other examples, a user may manually trace back the origin of the information included within the response 265 via embedded links, additional research, or both. Further, in some cases, an LLM may hallucinate or generate a fake or inaccurate source of information. The techniques of the present disclosure may streamline such process by automatically providing clear and detailed source attributions within the response 265.

For example, the techniques of the present disclosure describe the LLM 220 identifying and including the sources of the information included in the response 265 within the response 265 to enhance the trust and transparency of the LLM 220. As such, the LLM 220 may include both the information associated with the query 215 that the LLM 220 obtained from the data sets 245 in the response 265 and the source for the information in the response 265. By having the response 265 include the source of the information included in the response 265, the ambiguity of how the LLM 220 may generate the response, especially for information inferred by the LLM 220, may decrease accordingly. Further, the techniques of the present disclosure may result in an increase in trust in the LLM 220 and may allow the AI system using the LLM 220 to be more accessible, reliable, and trustworthy. In some examples, the response 265 may display the source of the information included in the response 265 via the user interface 210 of the client device 205 via a user-friendly presentation. For example, to present the source information in an accessible and understandable manner, the sources may be displayed within the response 265 as footnotes, hyperlinks, in-line citations, or any combination thereof. As such, by presenting the sources in a clear manner, the AI system of the LLM 220 may alleviate the trust issues of the LLM 220 and provide a clear insight into how the LLM 220 obtained the information in the response 265 (e.g., from the data sets 245), generated the information in the response 265, or both.

To support the LLM 220 having the response 265 include the source of the information included in the response 265, the LLM 220 generate a set of data queries 240 to query the data sets 245. The data queries 240 may be configured to obtain information related to or corresponding to the query 215 from one or more of the data sets 245. Further, the LLM 220 may perform a dual-pass processing procedure that includes generating the data queries 240 and generating the response 265 to the query 215 from a set of data query responses 260. In a first part of the dual-pass procedure, the LLM 220 may use the parsing service 225 to parse a query 215 that is used as an input to the LLM 220 (e.g., a natural language query 215). The parsing service 225 may receive the query 215 as an input to understand and interpret the query 215. The parsing service 225 may then parse the query 215 to generate a set of actionable queries that may indicate a respective data set of the data sets 245. Further, the set of actionable queries may indicate which data sets 245 the LLM 220 should query and indicate the information the LLM 220 should obtain from a respective data set 245. The query formulation service 230 of the LLM 220 may then use set of actionable queries to generate the data queries 240. The query formulation service 230 of the LLM 220 may transform the parsed input of the parsing service 225 (e.g., the set of actionable queries from the parsed query 215) into individual queries that may be capable of interacting with the data sets 245 (e.g., the data queries 240). Therefore, the data queries 240 may be capable of obtaining both the indicated information that may be relevant or related to the query 215 from a respective data set 245 and the source of the obtained information. As such, each actionable query from the set of actionable queries may correspond to a respective data query 240 that queries a respective data set 245 for a set of information or data related to the query 215. For example, a first actionable query may indicate that a first data set 245 may be used to query a first piece of data related to the query 215, and a second actionable query may indicate a second data set 245 may be used to query a second piece of data related to the query 215. Therefore, the query formulation service 230 may generate a first data query 240 to query the first data set 245 and a second data query 240 to query the second data set 245.

In some examples, the query 215 may be received at an interface of the LLM 220, and the interface may be an example of or access a service that performs "prompt engineering" to support the source identification techniques described herein. More particularly, the interface may receive the query 215 and add or modify the query 215 such that the LLM 220 is configured (by the modified query 215) to parse the query 215 and generate the data queries 240 (e.g., a response). For example, the query 215 from "user A" may be a natural language query 215 that states, "what are my sales numbers for the last quarter relative to my yearly targets," then the interface may add instructions that are ingestible by the LLM 220 to cause the LLM 220 to generate data queries 240 (e.g., structured query language (SQL) queries, NoSQL queries) that are configured for corresponding data sets 245, such as a data set that includes sales data. In such an example, the modified natural language query 215 might include instructions to query for sales data for user A from a sales data table and include the location from which this data is obtained. The instructions may also include instructions to generate a query for User A's yearly sales targets. The queries generated by the LLM 220, in accordance with such modified instructions, may be passed along to the data sets 245 via the connectors as described in further detail herein. Thus, the interface, the LLM 220, or both may include information (or the LLM may be trained on such information) that maps the type of data (e.g., sales data) to a corresponding data set 245 and to a corresponding data set type such that a syntactically correct data query may be generated. The modified instructions may also include instructions to generate the response 265 based on the information received from the data sets 245.

In some examples, the data queries 240 may be for internal data sets 245 or for external data sets 245. Internal data sets 245 may be connected to the LLM 220 via the internal data set connector 250 which may interface with the internal data sets 245. In some cases, internal data sets 245 may include internal databases (e.g., CRM platforms), email thread archives, and personal records (e.g., records associated with a client contact or a records associated with a salesperson). Further, the internal data set connector 250 may facilitate the retrieval of the information queried by the data queries 240. For example, the internal data sets 245 may be stored within a cloud platform 115 that may be connected to the LLM 220 or may also host the LLM 220. In some examples, the internal data sets may be examples of data sets that are associated with a tenant of a multi-tenant system (e.g., the cloud platform 115), as described with respect to FIG. 1. Thus, in the case of a cloud platform hosting or accessing multiple different LLMs for different tenants (e.g., cloud clients 105), each LLM may be associated with a respective internal data set. As such, the connection between the internal data sets 245 and the LLM 220 may be a direct connection. External data sets 245 may be connected to the LLM 220 via the external data set connector 255 which may enable connections with external data sets 245. In some examples, external data sets 245 may include public databases, online references, and other data sets 245 available by public data providers. Additionally, the external data sets may not be directly stored within the cloud platform 115. As such, the external data set connector 255 may enable a connection between the external data sets 245 and the LLM 220 which may not be directly connected otherwise. Further, by integrating information and data sets 245 from a broad array of sources, the LLM 220 may be capable of seamless and coherent content generation.

Using the data obtained from the data queries as indicated in the data query responses 260, the LLM 220 may use the response construction service 235 of the LLM 220 to generate and construct the response 265 to the query 215 as the second part of the dual-pass procedure. The response construction service 235 may receive the data query responses 260 that include information related to the query 215 and the source of the information, and the response construction service 235 may construct a user-friendly response 265 which may be in a natural language format. Further, as described elsewhere herein, the LLM 220 may display the sources of the information included in the response 265 via the user interface 210 of the client device 205 as footnotes, hyperlinks, in-line citations, or any combination thereof. As such, the LLM 220 may generate the response 265 using the response construction service 235 such that both the information related to the query 215 obtained from the data sets 245 via the data queries 240 and the source for the corresponding information are included in the response 265. Further, the response construction service 235 may add a footnote, hyperlink, or citation to the information obtained from the first data set 245 that may be indicative of the first data set 245, a location within the first data set 245, or both. The source information may include indications of the data set, a data table, a data object, a column, field, row, and/or the query itself. Additionally, or alternatively, the source information may be a file path, an object name, a website, a database, or the like.

In some examples, the response construction service 235 may use a content summarization and paraphrasing engine of the LLM 220. The content summarization and paraphrasing engine of the LLM 220 may manage the summarization and paraphrasing of the data query responses 260. Further the content summarization and paraphrasing engine of the LLM 220 may ensure that the summary of the information from the data query responses 260 may be concise and coherent while maintaining the transparency of indicating the source of the information used in the response 265. Further, the content summarization and paraphrasing engine may be implemented into the workflow of the LLM 220 and the computing system 200. For example, the content summarization and paraphrasing engine may be implemented within the response construction service 235 or another module of the LLM 220. In some cases, the content summarization and paraphrasing engine may be configured to summarize the content of the data query responses 260 but not the source of the information. That is, the source information may be included in tags or brackets such that the content summarization and paragraphs engine does not summarize the source, so that the source is accurate and identifiable when presented to the user.

Therefore, using the parsing service 225, the query formulation service 230, and the response construction service 235 of the LLM 220, the LLM 220 may be capable of providing a comprehensive, user-friendly solution for generated AI-assisted content (e.g., the response 265) with clear and transparent source inclusion. In some examples, the LLM 220 may be configured with other components or services. For example, the LLM 220 include a security and privacy service. The security and privacy service may implement encryption, authentication, and other security protocols to ensure the safe and responsible handling of sensitive data. For example, if the data included in the data query responses 260 from the data sets 245 includes sensitive data or information, the LLM 220 may implement an encryption procedure to encrypt the data. As such, the information included in the response 265 may include encrypted information. Further, prior to the LLM 220 transmitting the response 265 to the user interface 210 of the client device 205, the LLM 220 may transmit an authentication request. The authentication request may request a password, passphrase, key, or other form of authentication which may be connected to the encryption procedure and may indicate that a user may be capable of viewing the sensitive information within the response 265. In some cases, based on the input from a user in response to the authentication request, the LLM 220 may identify a security level associated with the user. As such, based on the security level, the LLM 220 may determine if the user is capable or allowed to (e.g., has the correct permissions) to view the sensitive information. Such encryption and authentication procedures may be implemented by the LLM 220 or adapted by the LLM 220 for an existing security protocol, thus enhancing the existing security protocol. Further, the encryption and authentication procedure described herein may comply with the security standards and privacy regulations of the computing system 200.

In some examples, the computing system 200 may also include a presentation layer. The presentation layer may format the response 265 to be displayed via the user interface 210 of the client device 205. For example, a user may transmit the query 215 as a natural language query 215 asking the LLM 220 for the average temperature in San Diego, CA. As such, the LLM 220 may use the components of the LLM 220 (e.g., the parsing service 225 and the query formulation service 230) to query the data sets 245 and based on the data query responses 260 generate the response 265 to answer the query 215 from the user. In some examples, the response 265 generated by the LLM 220 may be in a format as shown below which may be inexecutable by the client device 205.

```
{
  "response":{
    "content": "The average temperature in San Diego, CA
      is 64.2° F. The city is
    known for its mild climate and abundant sunshine.",
    "sourceAttribution": [
      {
        "detail": "Average temperature",
        "source": "National Weather Service",
        "url": https://www.weather.gov/
      },
      {
        "detail": "Climate description",
```

```
      "source": "San Diego Tourism Board",
      "url": https://www.sandiego.org/
    }
  ]
},
"userInteraction": {
  "query": "What is the average temperature in San
    Diego, CA?",
  "timestamp": "2023-08-14T12:34:56Z",
  "userId": "12345"
},
  "systemMetadata": {
  "version": "1.0",
  "processingTime": "250 ms",
  "dualPass": true
}
}
```

As such, the presentation layer may transform the response 265 into a format executable by the client device 205 and a format that the client device 205 may be capable of displaying via the user interface 210 of the client device 205. For example, the response 265 may be displayed in the user interface 210 of the client device 205 via a web page, a document, or any other format capable of displaying the response 265. As such, when the response 265 is displayed via a web page, the LLM 220 may transmit the response 265 to the presentation layer in the format above and the presentation layer may convert the format into a format that the client device 205 may use to display the response 265 as a web page as shown below (e.g., a hypertext markup language (HTML) format).

```
<!DOCTYPE html>
<html lang="en">
<head>
  <meta charset="UTF-8">
  <meta   name="viewport"   content="width=device-
    width, initial-scale=1.0">
  <title>Query Response</title>
  <style>
    .footnote {
      font-size: 0.8em;
      vertical-align: super;
    }
  </style>
</head>
<body>
  <p> The average temperature in San Diego, CA is 64.2°
    F.<sup
class="footnote"><a    href="https://www.weather.gov/"
  target="_blank">1</a></sub>.
The city is known for its mild climate and abundant
  sunshine<sup
class="footnote"><a href="https://www.sandiego.ora/"
target="_blank">2</a></sup>.</p>
  <ol>
    <li><a          href="https://www.weather.gov/"
      target="_blank"></a></li>
    <li>"><a          href="https://www.sandiego.org/"
      target="_blank"></a></li>
  </ol>
</body>
</html>
```

In some examples, the presentation layer may be developed for the computing system 200 or may modify an existing presentation layer. As such, the presentation layer of the computing system 200 may enable the client device 205 to display the response 265 via the user interface 210 where the response 265 includes the source of the information included in the response 265. In some cases, the presentation later may be integrated or a part of the user interface 210 of the client device 205 such that the client device 205 may convert the format of response 265 into the executable format shown above.

Additionally, or alternatively, the computing system 200 may include a monitoring and analytics service. In some cases, the monitoring and analytics service may be a part of the client device 205 or a separate service within the computing system 200. The monitoring and analytics service may collect data on user interactions, system performance, and other metrics for ongoing improvement and analysis of the computing system 200 and ensuring that the computing system 200 remains compliant with relevant regulation and standards. For example, the monitoring and analytic service may monitor how often a user interacts with the source information included in the response 265. As such, the monitoring and analytic service may determine that a user may be more likely to interact with the source information if the LLM 220 includes the source as a hyperlink compared including the source as a footnote. Therefore, the response construction service 235 of the LLM 220 may generate the response 265 to include sources for the information in the response 265 as hyperlinks rather than as footnotes. Further, the monitoring and analytics service may extend or modify the functionality of an existing monitoring and analytics module to include metrics associated with user interaction of the source information to allow for ongoing improvement of the computing system 200 to align with user needs.

Additionally, or alternatively, the computing system 200 may include customization settings that may enable a user to tailor the presentation of the response 265. For example, a user may prefer that the response 265 include the source of a piece of information in the response 265 as a hyperlink. In some examples, the settings enabled by the customization settings may override any preferences set based on user interactions indicated by the monitoring and analytic service described herein. Further, the settings may include options for how the sources may be displayed via the user interface 210 of the client device 205, preferences for data sets 245 to be used to obtain the information for the response 265 (e.g., a preference of specific data sets 245, a preference of internal data sets 245 or external data sets, or both), or any combination thereof. In some examples, the customization settings may be user specific and may be integrated with other options within an existing setting or preferences panel used to enable users to tailor the presentation of the response 265 via the user interface 210. In some other examples, the customization settings may be for a group of users (e.g., a company, a team, a group of users sharing the same job title, or any combination thereof). As such, users may be able to customize the presentation of the response 265 to fit a user's individual preferences or the expected of a domain (e.g., a field, industry, or company).

Therefore, the LLM 220 and the computing system 200 may be capable of providing responses 265 to queries 215 that include both information related to the queries 215 and the source (e.g., the location within the data sets or which data sets 245 were used) of the information. In some cases, the techniques of the present disclosure described herein may be integrated with existing systems, platforms, and workflow. For example, the techniques of the computing system 200 may be embedded within existing CRM tools, email clients, or other applications. Further, the computing system 200 may be integrated with existing LLMs 220. That is, an LLM 220 may be adapted to include the dual-pass processing procedure by enabling the LLM 220 to parse a query 215, generate the data queries 240, and generate the response 265. In some cases, such procedures may be executed using existing modules of an LLM 220 or the parsing service 225, the query formulation service 230, and the response construction service 235 may be added to an LLMs 220 architecture. Such integrations may be supported by the computing system 200 developing adapters or APIs to integrate the techniques of the present disclosure with work-flows, tools, and platforms used by users.

As such, by allowing the computing system 200 to be integrated with current systems or by allowing current systems to implement the techniques of the present disclosure, the computing system 200 may be adaptable and versatile to multiple different domains or fields (e.g., industries). For example, as described elsewhere herein, a sales representative may use an AI system (e.g., the computing system 200) to generate a customized sales proposal for a potential client. A LLM 220 of the computing system 200 may retrieve or obtain data from a CRM that the sales representative may be using, past emails, external databases, the potential client's purchase history, the potential client's preferences, and demographic data of the potential client. As such, the sales representative may receive a sales proposal (e.g., a response 265) generated by the LLM 220 using such obtained information based on transmitting a query 215 (e.g., a natural language query 215) to generate a customized sales proposal. As described herein, the LLM 220 may clearly annotate the information included in the sales proposal enabling the sales representative to identify where the LLM 220 obtained the data from (e.g., location within a data set 245), if the LLM 220 inferred the information, or both.

In some examples, a customer service representative may use the computing system 200 to analyze past interactions with customers, support tickets, and knowledge base articles to respond to customer inquiries. As such, the customer service representative may transmit the customer inquiry as a natural language query 215 to a LLM 220 and may relay the response 265 to the user. Such system may enable the customer service representative to understand the source of the information included in the response 265 to allow the customer service representative and the customers to understand the basis for a provided solution in the response 265 of the customer inquiry (e.g., the natural language query 215). In some other examples, a healthcare professional (e.g., a doctor, a nurse, a health insurance agent, a medical student, or any combination thereof) may use the computing system 200 to compile patient information, diagnoses, and treatment plans that may benefit from clear sourcing. As such, a healthcare professional may transmit a natural language query 215 to the LLM 220 asking what treatment plan should be used for a patient with a diagnosis based on past treatment plans used, past diagnoses, and the patient information. The LLM 220 may then generate a response 265 for the healthcare professional that includes where the information was sourced from (e.g., medical records, lab results, and other data related to the patient) to enhance the accuracy and the trustworthiness of the compiled medical documents. In most cases, such medical information may be sensitive and confidential. Some AI systems may focus directly on privacy and security of data within LLM 220 generated responses, however, such systems may be unable to provide sources for the data to increase the contextual understanding of a response 265 and decrease the source ambiguity of the response 265. Therefore, as described herein, the LLM 220 may both include the source information in the response 265 and encrypt the response 265 to ensure a high level of privacy and security. To prevent users without access to the patient information, the LLM 220 may transmit an authentication request to the healthcare professional before the healthcare professional can access the information of the response 265. In some examples, the authentication request may be an example of a password, a pass key, a pin number, a passphrase, or any combination thereof.

In another example, a legal professional (e.g., a lawyer, a paralegal, a law student, or any combination thereof) may use the computing system 200 to analyze legal documents, case law, and regulation. By using the techniques of the present disclosure, the legal professional may be able to trace the origin of the legal arguments, quotations, and references used by a LLM 220 in a response 265 to a query 215. Therefore, the legal professional may be able to have an enhanced level of trust in the LLM 220 by being capable of ensuring that the content generated by the LLM 220 is credible and aligned with any relevant legal standards. Additionally, or alternatively, the legal documents used by a legal professional may include sensitive, confidential, or private information and the LLM 220 may encrypt the information of the response 265 as described herein. Further, in some other examples, an educator or student may use the computing system 200 to have the LLM 220 generate study materials, research papers, or lesson plans. When generating such information, the educators or students may use the techniques of the present disclosure to enable facts, theories, and quotations to be clearly and accurately sourced and annotated within a generated response 265. As such, the computing system 200 may enhance the credibility and trust in LLMs 220 to generate educational content and assist in facilitating research and learning. Additionally, or alternatively, the computing system 200 may be adapted to the specific fields described herein. For example, based on the field using the computing system 200 and the LLM 220, the presentation and display of the response 265 may change due to the preferences of a field.

Therefore, by using the computing system 200 and the techniques of the present disclosure, there may be an increase in transparency, trust, and usability in LLM 220 generated content (e.g., the response 265 of the query 215). For example, by providing the sources of the information included in the response 265 a user may be provided with a clear insight into the sources used (e.g., the data sets 245 used) by the LLM 220 in generating the response 265 therefore reducing the ambiguity and confusion of the origins of the information in the response 265. Further, there may be an increase in trust in the LLM 220 by including the sources for information in the response 265 and by managing sensitive and confidential data by encrypting the response 265. In some examples, the integration of multiple different data sets 245 and the ability to determine the origin of the data within a response 265 may also enhance the trust and useability of LLMs 220. Additionally, or alternatively, by including the source information, users may be capable of discerning between information within the response 265 directly sourced from a data set 245 and information inferred by the LLM 220. As such, the clarity and contextual understanding of the information included in the response 265 may be increased. Further descriptions of including sources for the information included in a response 265 generated by a LLM 220 in response to a query 215 that enhance the trust, transparency, and usability of LLMs 220 may be described elsewhere herein including with reference to FIG. 3.

Figure 3:
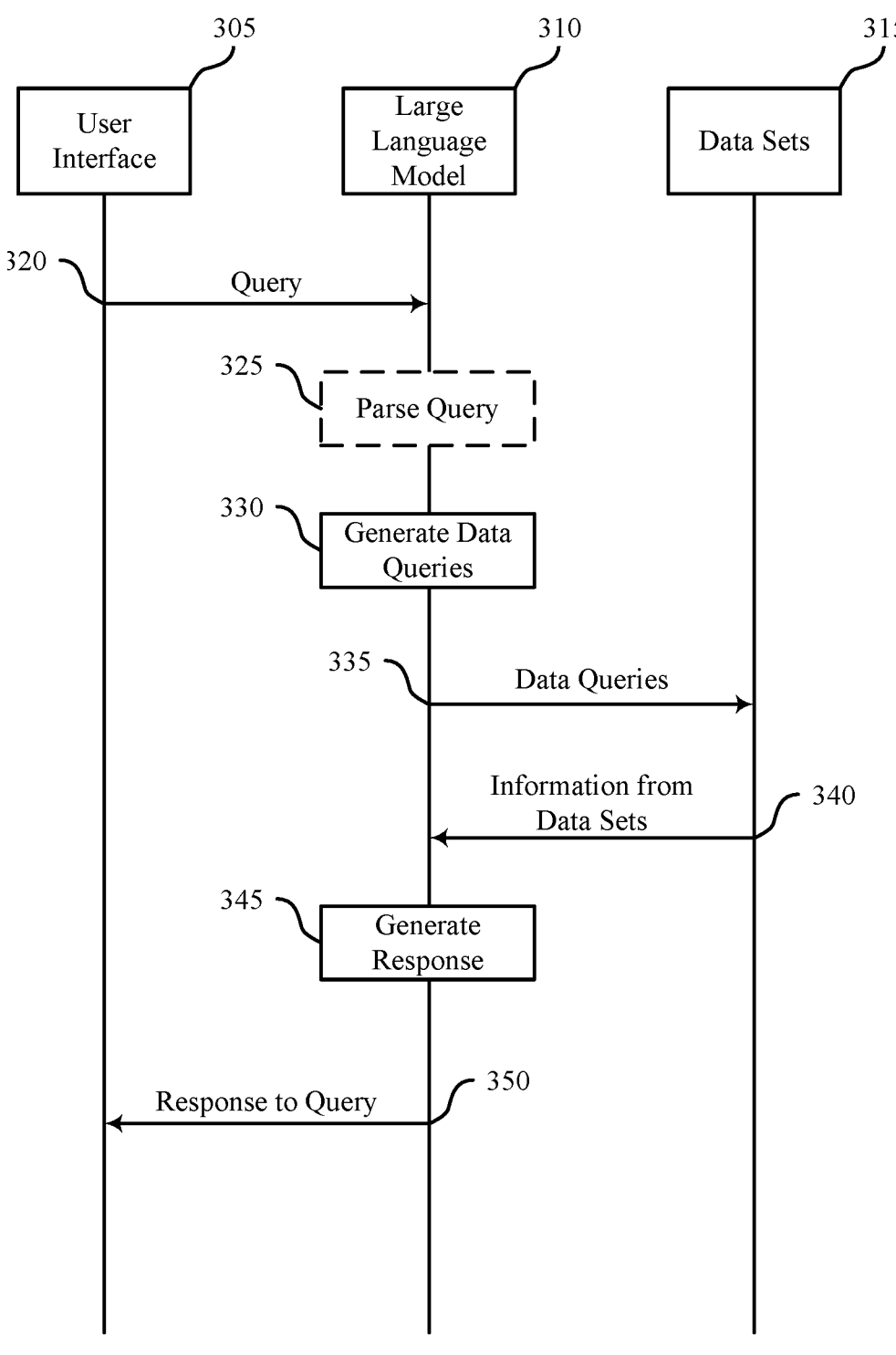
FIG. 3 shows an example of a process flow that supports generated content source attribution in accordance with aspects of the present disclosure.

FIG. 3 shows an example of a process flow 300 that supports generated content source attribution in accordance with aspects of the present disclosure. In some examples, the process flow 300 may implement or be implemented by the system 100 and/or the computing system 200. The process flow 300 may include a user interface 305, a LLM 310, and data sets 315 which may be described elsewhere herein with reference to FIGS. 1 and 2. For example, the user interface 305 may be for a device (e.g., a cloud client 105 or contact 110) described with reference to FIG. 1 and the data sets 315 may be stored in a cloud platform 115, a data center 120, or both.

In the following description of the process flow 300, the operations may be performed by the user interface 305, the LLM 310, and the data sets 315 in different orders or at different times. Some operations may also be left out of the process flow 300, or other operations may be added. Although the process flow 300 may be described as being performed by the user interface 305, the LLM 310, and the data sets 315, some aspects of some operations may also be performed by other devices, services, or models described elsewhere herein including with reference to FIG. 1.

At 320, the LLM 310 may receive a query (e.g., a natural language query) from or via the user interface 305 of a client device. In some examples, at 325, the LLM 310 may parse the natural language query into one or more actionable queries where each actionable query may indicate a respective data set 315 from one or more data sets 315.

As such, at 330, the LLM 310 may generate one or more data queries from the natural language query. The LLM 310 may configure the one or more data queries to query the one or more data sets 315 of a set of data sets 315. In some cases, the one or more data queries may be generated based on the LLM 310 generating the one or more actionable queries from parsing the natural language query at 325. Further, in some examples, the one or more data sets 315 may include one or more internal data sets 315, one or more external data sets 315, or any combination thereof. The one or more internal data sets 315 may be directly connected to the LLM 310 and may include a CRM platform, a multi-tenant database system, email archives for one or more tenants in the multi-tenant database system, public records and/or private records of one or more tenants in the multi-tenant database system or any combination thereof. The one or more external data sets 315 may be indirectly connected to the LLM 310 and may include one or more public databases, online information references, data sets from public data providers, or any combination thereof. Following generating the one or more data queries at 330, the LLM 310 may transmit the one or more data queries to the one or more data sets 315 of the set of data sets 315 at 335.

At 340, the LLM 310 may receive, from the one or more data sets 315 of the set of data sets 315, information associated with the natural language query and a source for the information. The source may be indicative of a location within the one or more data sets 315 from which the information may be obtained. At 345, the LLM 310 may generate a response to the natural language query. The response to the natural language query may include the information associated with the natural language query obtained at 340 and the source for the information. In some examples, generating the response may include generating a response that includes an inference related to the data obtained from the one or more data sets 315 via the one or more data queries at 340. As such, the source for the information may be indicative of the location of the data that may be used for the inference by the LLM 310. In some other examples, the LLM 310 may generate a summary of the information associated with the natural language query that is received from the one or more data queries at 340. Therefore, the response generated at 345 may include the summary of the information and the source for the information that is summarized. In some cases, the information associated with the natural language query that may be received from the one or more data queries at 340 may include sensitive data. As such, the LLM 310 may perform an encryption procedure on the sensitive data included within the information associated with the natural language query that may be received from the one or more data queries to generate a set of encrypted information. The response generated at 345 may then include the information associated with the natural language query and the source for the information where the information may include the set of encrypted information. Further, the LLM 310 may transmit, to the user interface 305, an authentication request prior to a transmission of the response to the user interface 305 based on the information in the response including the set of encrypted information.

At 350, the LLM 310 may transmit, to the user interface 305 for display, the response to the natural language query that includes the information and the source for the information. In some examples, the source information may be displayed via the user interface 305 as a footnote, a hyperlink, an in-link citation, or any combination thereof.

Figure 4:
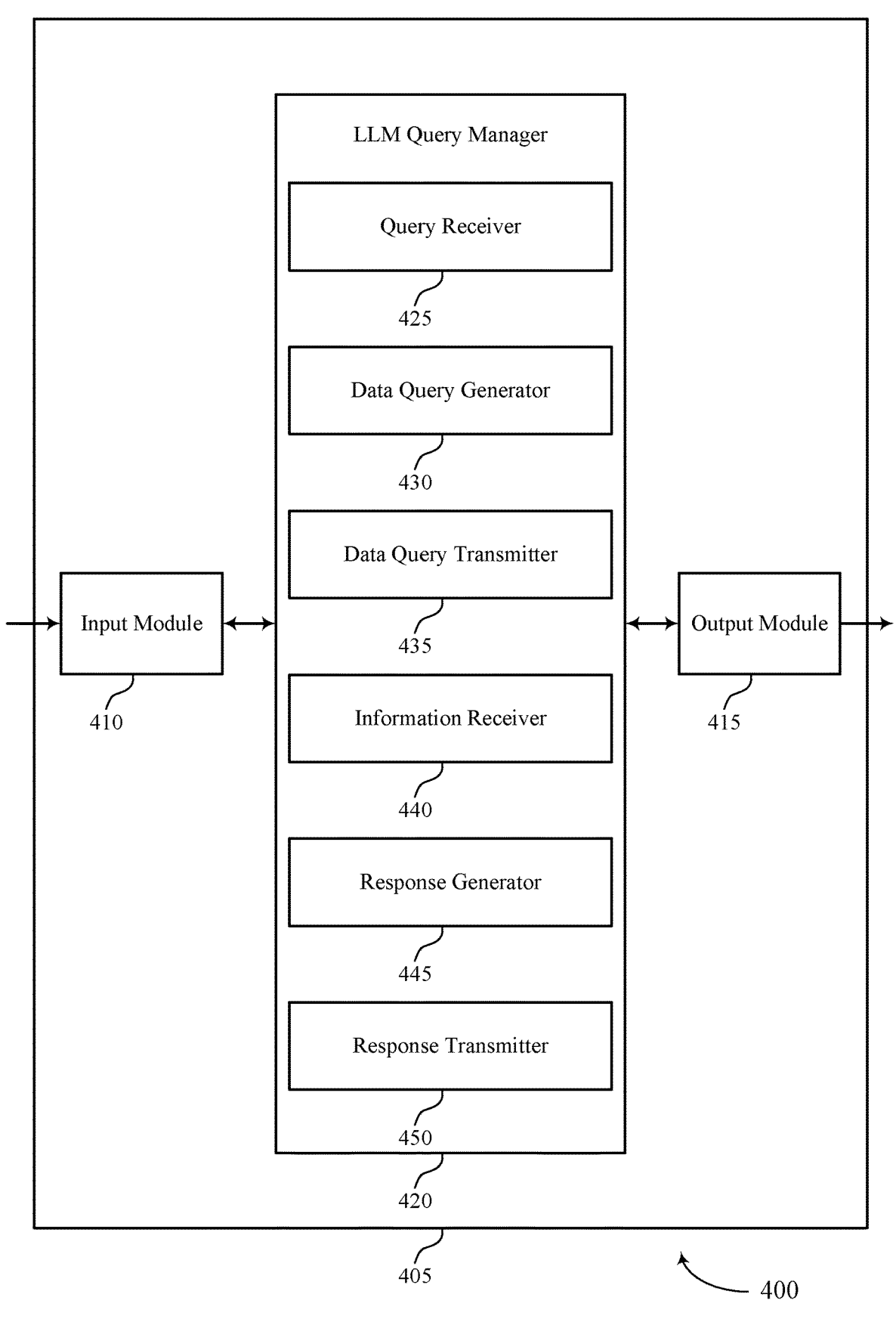
FIG. 4 shows a block diagram of an apparatus that supports generated content source attribution in accordance with aspects of the present disclosure.

FIG. 4 shows a block diagram 400 of a device 405 that supports generated content source attribution in accordance with aspects of the present disclosure. The device 405 may include an input module 410, an output module 415, and an LLM query manager 420. The device 405, or one of more components of the device 405 (e.g., the input module 410, the output module 415, and the LLM query manager 420), may include at least one processor, which may be coupled with at least one memory, to support the described techniques. Each of these components may be in communication with one another (e.g., via one or more buses or communication interfaces).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the LLM query manager 420 to support generated content source attribution. In some cases, the input module 410 may be a component of an input/output (I/O) controller 610 as described with reference to FIG. 6.

The output module 415 may manage output signals for the device 405. For example, the output module 415 may receive signals from other components of the device 405, such as the LLM query manager 420, and may transmit these signals to other components or devices. In some examples, the output module 415 may transmit output signals for display in a user interface, for storage in a database or data store, for further processing at a server or server cluster, or for any other processes at any quantity of devices or systems. In some cases, the output module 415 may be a component of an I/O controller 610 as described with reference to FIG. 6.

For example, the LLM query manager 420 may include a query receiver 425, a data query generator 430, a data query transmitter 435, an information receiver 440, a response generator 445, a response transmitter 450, or any combination thereof. In some examples, the LLM query manager 420, or various components thereof, may be configured to perform various operations (e.g., receiving, monitoring, transmitting) using or otherwise in cooperation with the input module 410, the output module 415, or both. For example, the LLM query manager 420 may receive information from the input module 410, send information to the output module 415, or be integrated in combination with the input module 410, the output module 415, or both to receive information, transmit information, or perform various other operations as described herein.

The LLM query manager 420 may support data processing in accordance with examples as disclosed herein. The query receiver 425 may be configured to support receiving, via a user interface, a natural language query. The data query generator 430 may be configured to support generating, via a LLM, one or more data queries from the natural language query, where the one or more data queries are configured to query one or more data sets of a set of multiple data sets. The data query transmitter 435 may be configured to support transmitting the one or more data queries to the one or more data sets of the set of multiple data sets. The information receiver 440 may be configured to support receiving, from the one or more data sets of the set of multiple data sets, information associated with the natural language query and a source for the information, where the source is indicative of a location within the one or more data sets from which the information is obtained. The response generator 445 may be configured to support generating, via the LLM, a response to the natural language query, where the response includes the information associated with the natural language query and the source for the information. The response transmitter 450 may be configured to support transmitting, to the user interface for display, the response to the natural language query that includes the information and the source for the information.

Figure 5:
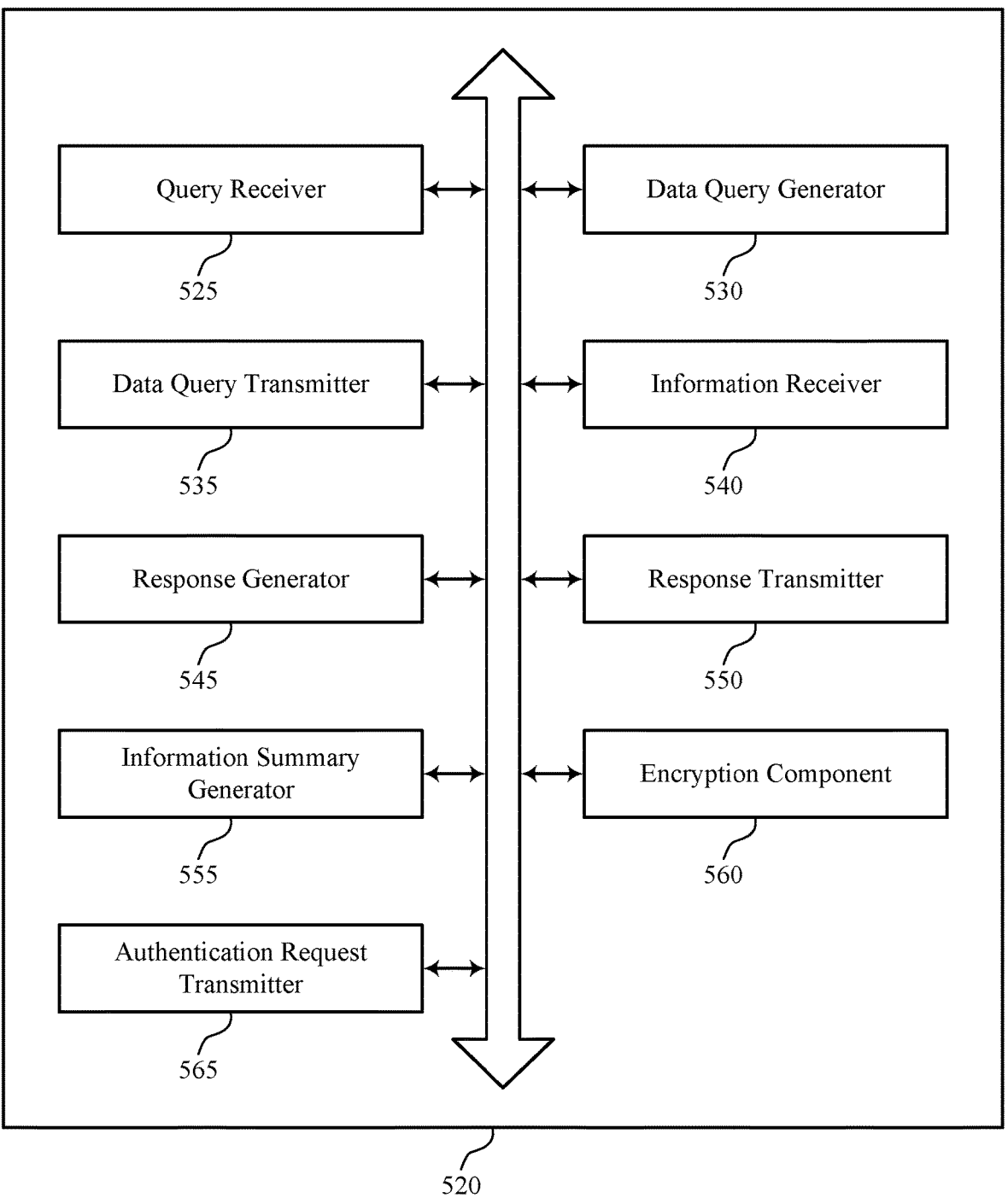
FIG. 5 shows a block diagram of an LLM query manager that supports generated content source attribution in accordance with aspects of the present disclosure.

FIG. 5 shows a block diagram 500 of an LLM query manager 520 that supports generated content source attribution in accordance with aspects of the present disclosure. The LLM query manager 520 may be an example of aspects of LLM query manager 420*b* as described herein. The LLM query manager 520, or various components thereof, may be an example of means for performing various aspects of generated content source attribution as described herein. For example, the LLM query manager 520 may include a query receiver 525, a data query generator 530, a data query transmitter 535, an information receiver 540, a response generator 545, a response transmitter 550, an information summary generator 555, an encryption component 560, an authentication request transmitter 565, or any combination thereof. Each of these components, or components of subcomponents thereof (e.g., one or more processors, one or more memories), may communicate, directly or indirectly, with one another (e.g., via one or more buses or communication interfaces).

The LLM query manager 520 may support data processing in accordance with examples as disclosed herein. The query receiver 525 may be configured to support receiving, via a user interface, a natural language query. The data query generator 530 may be configured to support generating, via a LLM, one or more data queries from the natural language query, where the one or more data queries are configured to query one or more data sets of a set of multiple data sets. The data query transmitter 535 may be configured to support transmitting the one or more data queries to the one or more data sets of the set of multiple data sets. The information receiver 540 may be configured to support receiving, from the one or more data sets of the set of multiple data sets, information associated with the natural language query and a source for the information, where the source is indicative of a location within the one or more data sets from which the information is obtained. The response generator 545 may be configured to support generating, via the LLM, a response to the natural language query, where the response includes the information associated with the natural language query and the source for the information. The response transmitter 550 may be configured to support transmitting, to the user interface for display, the response to the natural language query that includes the information and the source for the information.

In some examples, to support generating the response, the response generator 545 may be configured to support generating the response that includes an inference related to data obtained from the one or more data sets via the one or more data queries, where the source for the information is indicative of the location of the data that is used for the inference by the LLM.

In some examples, to support generating the one or more data queries, the data query generator 530 may be configured to support parsing, via the LLM, the natural language query into one or more actionable queries, each one of the one or more actionable queries indicating a respective data set of the one or more data sets, where the one or more data queries are generated based on the one or more actionable queries.

In some examples, to support transmitting the response to the user interface for display, the response transmitter 550 may be configured to support transmitting, to the user interface for display, the response to the natural language query that includes the source for the information, where the source for the information is displayed via the user interface as a footnote, a hyperlink, an in-line citation, or any combination thereof.

In some examples, the information summary generator 555 may be configured to support generating, via the LLM, a summary of the information associated with the natural language query that is received from the one or more data queries, where the response includes the summary of the information and the source for the information that is summarized.

In some examples, the information associated with the natural language query that is received from the one or more data queries may include sensitive data, and the encryption component 560 may be configured to support performing, an encryption procedure on the sensitive data included within the information associated with the natural language query that is received from the one or more data queries to generate a set of encrypted information, where the response includes the information associated with the natural language query and the source for the information, and where the information includes the set of encrypted information.

In some examples, the authentication request transmitter 565 may be configured to support transmitting, to the user interface, an authentication request prior to a transmission of the response to the user interface based on the information included in the response including the set of encrypted information.

In some examples, the one or more data sets may include one or more internal data sets, one or more external data sets, or any combination thereof.

In some examples, the one or more internal data sets may be directly connected to the LLM and may include a customer relationship management platform, a multi-tenant database system, email archives for one or more tenants in the multi-tenant database system, public records of one or more tenants in the multi-tenant database system, or any combination thereof.

In some examples, the one or more external data sets may be indirectly connected to the LLM and may include one or more public databases, online information references, data sets from public data providers, or any combination thereof.

Figure 6:
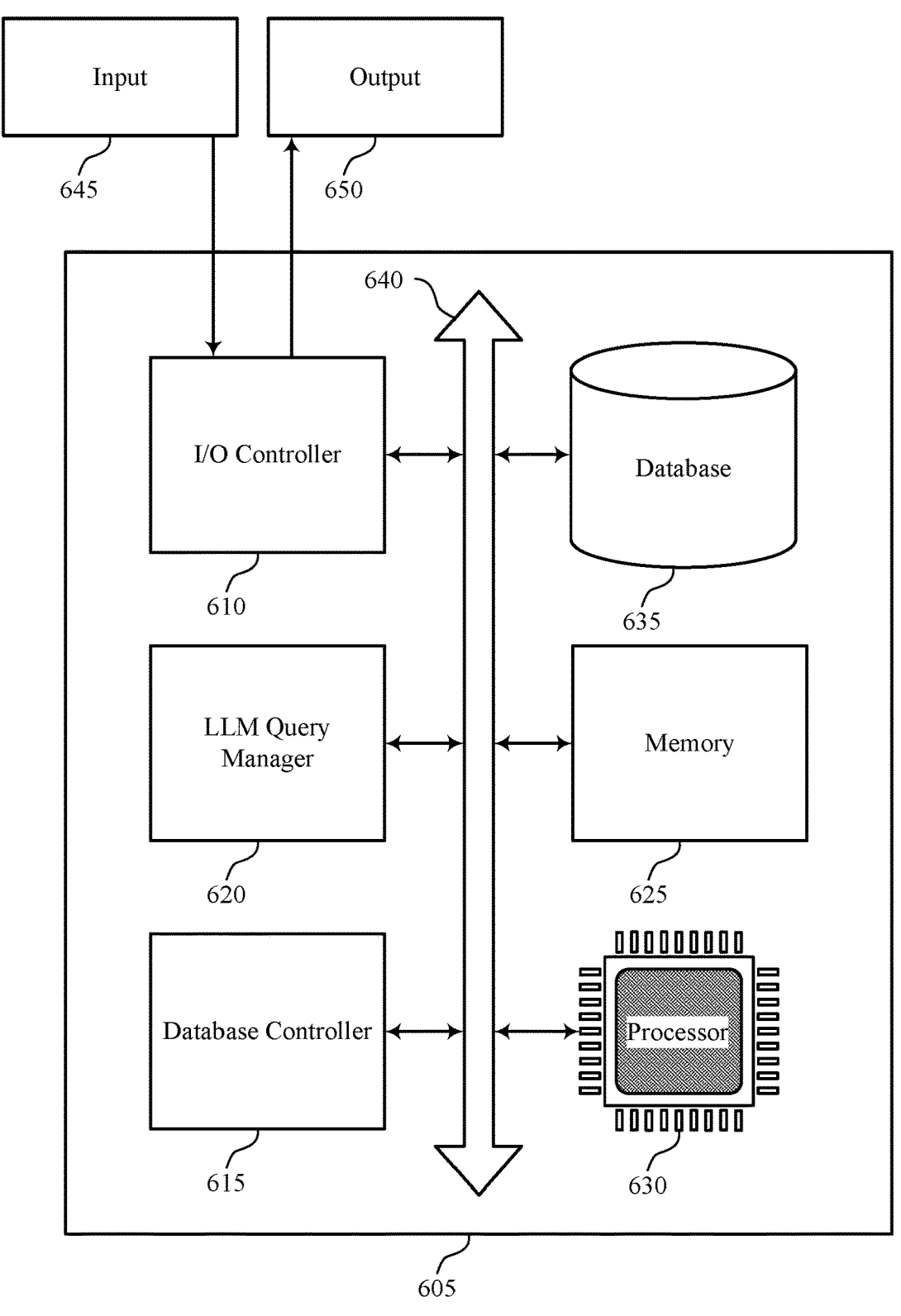
FIG. 6 shows a diagram of a system including a device that supports generated content source attribution in accordance with aspects of the present disclosure.

FIG. 6 shows a diagram of a system 600 including a device 605 that supports generated content source attribution in accordance with aspects of the present disclosure. The device 605 may be an example of or include the components of a device 405 as described herein. The device 605 may include components for cloud services and communications including components for transmitting and receiving communications, such as an LLM query manager 620, and I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof).

In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting generated content source attribution). The processor 630 may be an example of a single processor or multiple processors. For example, the device 605 may include one or more processors 630.

The LLM query manager 620 may support data processing in accordance with examples as disclosed herein. For example, the LLM query manager 620 may be configured to support receiving, via a user interface, a natural language query. The LLM query manager 620 may be configured to support generating, via a LLM, one or more data queries from the natural language query, where the one or more data queries are configured to query one or more data sets of a set of multiple data sets. The LLM query manager 620 may be configured to support transmitting the one or more data queries to the one or more data sets of the set of multiple data sets. The LLM query manager 620 may be configured to support receiving, from the one or more data sets of the set of multiple data sets, information associated with the natural language query and a source for the information, where the source is indicative of a location within the one or more data sets from which the information is obtained. The LLM query manager 620 may be configured to support generating, via the LLM, a response to the natural language query, where the response includes the information associated with the natural language query and the source for the information. The LLM query manager 620 may be configured to support transmitting, to the user interface for display, the response to the natural language query that includes the information and the source for the information.

By including or configuring the LLM query manager 620 in accordance with examples as described herein, the device 605 may support techniques for a LLM to include a source of the information included in a response to a natural language query for enhanced trust in LLMs, an increase in transparency, an contextual understanding of the information of the response, a user-friendly presentation, and a customized and flexible presentation of the sourced information.

Figure 7:
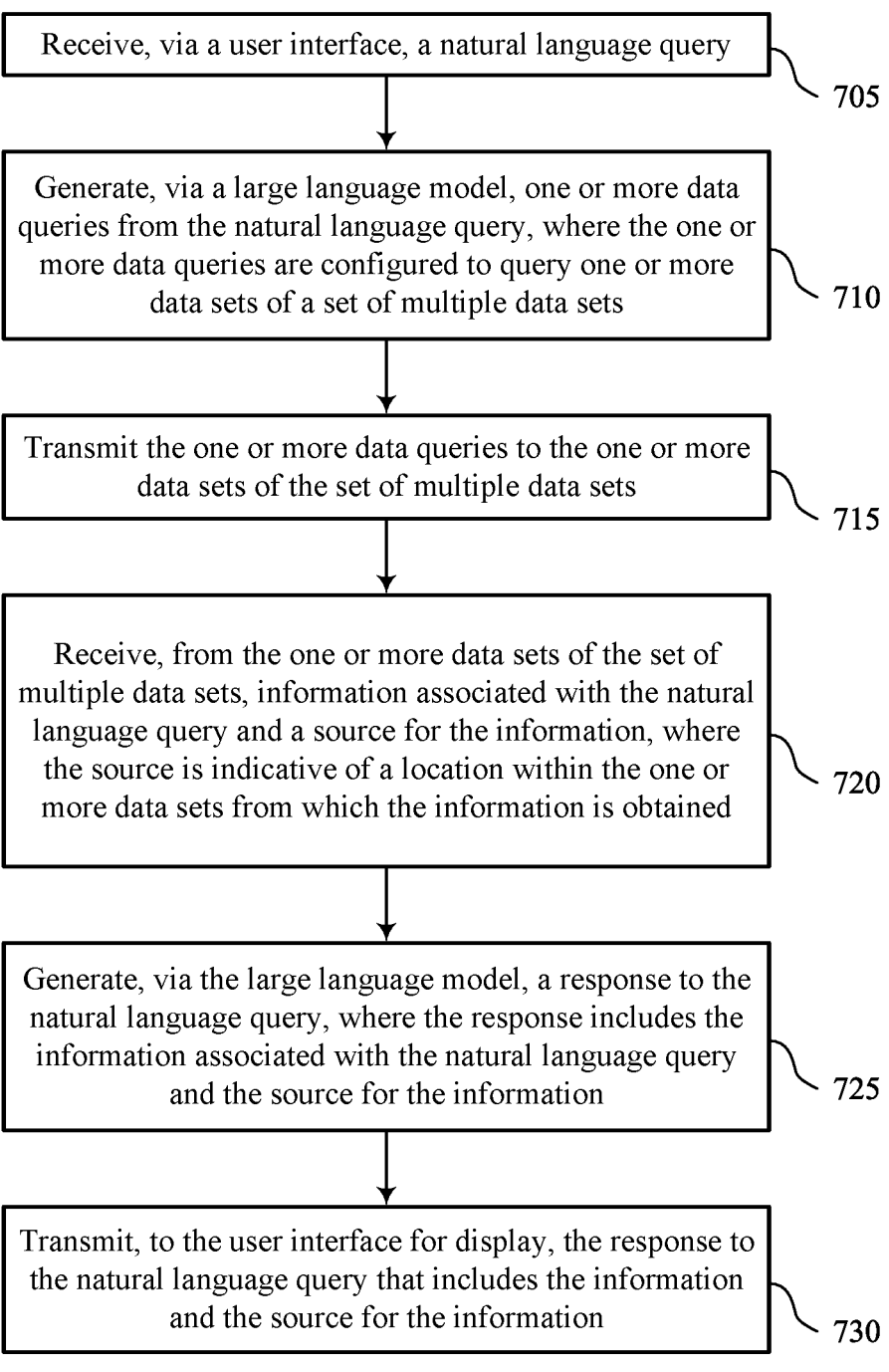

FIG. 7 shows a flowchart illustrating a method 700 that supports generated content source attribution in accordance with aspects of the present disclosure. The operations of the method 700 may be implemented by a natural language query service or its components as described herein. For example, the operations of the method 700 may be performed by a natural language query service as described with reference to FIGS. 1 through 6. In some examples, a natural language query service may execute a set of instructions to control the functional elements of the natural language query service to perform the described functions. Additionally, or alternatively, the natural language query service may perform aspects of the described functions using special-purpose hardware.

At 705, the method may include receiving, via a user interface, a natural language query. The operations of block 705 may be performed in accordance with examples as disclosed herein. In some examples, aspects of the operations of 705 may be performed by a query receiver 525 as described with reference to FIG. 5.

At 710, the method may include generating, via a LLM, one or more data queries from the natural language query, where the one or more data queries are configured to query one or more data sets of a set of multiple data sets. The operations of block 710 may be performed in accordance with examples as disclosed herein. In some examples, aspects of the operations of 710 may be performed by a data query generator 530 as described with reference to FIG. 5.

At 715, the method may include transmitting the one or more data queries to the one or more data sets of the set of multiple data sets. The operations of block 715 may be performed in accordance with examples as disclosed herein. In some examples, aspects of the operations of 715 may be performed by a data query transmitter 535 as described with reference to FIG. 5.

At 720, the method may include receiving, from the one or more data sets of the set of multiple data sets, information associated with the natural language query and a source for the information, where the source is indicative of a location within the one or more data sets from which the information is obtained. The operations of block 720 may be performed in accordance with examples as disclosed herein. In some examples, aspects of the operations of 720 may be performed by an information receiver 540 as described with reference to FIG. 5.

At 725, the method may include generating, via the LLM, a response to the natural language query, where the response includes the information associated with the natural language query and the source for the information. The operations of block 725 may be performed in accordance with examples as disclosed herein. In some examples, aspects of the operations of 725 may be performed by a response generator 545 as described with reference to FIG. 5.

At 730, the method may include transmitting, to the user interface for display, the response to the natural language query that includes the information and the source for the information. The operations of block 730 may be performed in accordance with examples as disclosed herein. In some examples, aspects of the operations of 730 may be performed by a response transmitter 550 as described with reference to FIG. 5.

FIG. 8 shows a flowchart illustrating a method 800 that supports generated content source attribution in accordance with aspects of the present disclosure. The operations of the method 800 may be implemented by a natural language query service or its components as described herein. For example, the operations of the method 800 may be performed by a natural language query service as described with reference to FIGS. 1 through 6. In some examples, a natural language query service may execute a set of instructions to control the functional elements of the natural language query service to perform the described functions. Additionally, or alternatively, the natural language query service may perform aspects of the described functions using special-purpose hardware.

At 805, the method may include receiving, via a user interface, a natural language query. The operations of block 805 may be performed in accordance with examples as disclosed herein. In some examples, aspects of the operations of 805 may be performed by a query receiver 525 as described with reference to FIG. 5.

At 810, the method may include parsing, via the LLM, the natural language query into one or more actionable queries, each one of the one or more actionable queries indicating a respective data set of the one or more data sets, where one or more data queries are generated based on the one or more actionable queries. The operations of block 810 may be performed in accordance with examples as disclosed herein.

In some examples, aspects of the operations of 810 may be performed by a data query generator 530 as described with reference to FIG. 5.

At 815, the method may include generating, via a LLM, the one or more data queries from the natural language query, where the one or more data queries are configured to query one or more data sets of a set of multiple data sets. The operations of block 815 may be performed in accordance with examples as disclosed herein. In some examples, aspects of the operations of 815 may be performed by a data query generator 530 as described with reference to FIG. 5.

At 820, the method may include transmitting the one or more data queries to the one or more data sets of the set of multiple data sets. The operations of block 820 may be performed in accordance with examples as disclosed herein. In some examples, aspects of the operations of 820 may be performed by a data query transmitter 535 as described with reference to FIG. 5.

At 825, the method may include receiving, from the one or more data sets of the set of multiple data sets, information associated with the natural language query and a source for the information, where the source is indicative of a location within the one or more data sets from which the information is obtained. The operations of block 825 may be performed in accordance with examples as disclosed herein. In some examples, aspects of the operations of 825 may be performed by an information receiver 540 as described with reference to FIG. 5.

At 830, the method may include generating, via the LLM, a response to the natural language query, where the response includes the information associated with the natural language query and the source for the information. The operations of block 830 may be performed in accordance with examples as disclosed herein. In some examples, aspects of the operations of 830 may be performed by a response generator 545 as described with reference to FIG. 5.

At 835, the method may include transmitting, to the user interface for display, the response to the natural language query that includes the information and the source for the information. The operations of block 835 may be performed in accordance with examples as disclosed herein. In some examples, aspects of the operations of 835 may be performed by a response transmitter 550 as described with reference to FIG. 5.

FIG. 9 shows a flowchart illustrating a method 900 that supports generated content source attribution in accordance with aspects of the present disclosure. The operations of the method 900 may be implemented by a natural language query service or its components as described herein. For example, the operations of the method 900 may be performed by a natural language query service as described with reference to FIGS. 1 through 6. In some examples, a natural language query service may execute a set of instructions to control the functional elements of the natural language query service to perform the described functions. Additionally, or alternatively, the natural language query service may perform aspects of the described functions using special-purpose hardware.

At 905, the method may include receiving, via a user interface, a natural language query. The operations of block 905 may be performed in accordance with examples as disclosed herein. In some examples, aspects of the operations of 905 may be performed by a query receiver 525 as described with reference to FIG. 5.

At 910, the method may include generating, via a LLM, one or more data queries from the natural language query, where the one or more data queries are configured to query one or more data sets of a set of multiple data sets. The operations of block 910 may be performed in accordance with examples as disclosed herein. In some examples, aspects of the operations of 910 may be performed by a data query generator 530 as described with reference to FIG. 5.

At 915, the method may include transmitting the one or more data queries to the one or more data sets of the set of multiple data sets. The operations of block 915 may be performed in accordance with examples as disclosed herein. In some examples, aspects of the operations of 915 may be performed by a data query transmitter 535 as described with reference to FIG. 5.

At 920, the method may include receiving, from the one or more data sets of the set of multiple data sets, information associated with the natural language query and a source for the information, where the source is indicative of a location within the one or more data sets from which the information is obtained. The operations of block 920 may be performed in accordance with examples as disclosed herein. In some examples, aspects of the operations of 920 may be performed by an information receiver 540 as described with reference to FIG. 5.

At 925, the method may include generating, via the LLM, a summary of the information associated with the natural language query that is received from the one or more data queries, where a response to the natural language query includes the summary of the information and the source for the information that is summarized. The operations of block 925 may be performed in accordance with examples as disclosed herein. In some examples, aspects of the operations of 925 may be performed by an information summary generator 555 as described with reference to FIG. 5.

At 930, the method may include generating, via the LLM, the response to the natural language query, where the response includes the information associated with the natural language query and the source for the information. The operations of block 930 may be performed in accordance with examples as disclosed herein. In some examples, aspects of the operations of 930 may be performed by a response generator 545 as described with reference to FIG. 5.

At 935, the method may include transmitting, to the user interface for display, the response to the natural language query that includes the information and the source for the information. The operations of block 935 may be performed in accordance with examples as disclosed herein. In some examples, aspects of the operations of 935 may be performed by a response transmitter 550 as described with reference to FIG. 5.

FIG. 10 shows a flowchart illustrating a method 1000 that supports generated content source attribution in accordance with aspects of the present disclosure. The operations of the method 1000 may be implemented by a natural language query service or its components as described herein. For example, the operations of the method 1000 may be performed by a natural language query service as described with reference to FIGS. 1 through 6. In some examples, a natural language query service may execute a set of instructions to control the functional elements of the natural language query service to perform the described functions. Additionally, or alternatively, the natural language query service may perform aspects of the described functions using special-purpose hardware.

At 1005, the method may include receiving, via a user interface, a natural language query. The operations of block 1005 may be performed in accordance with examples as disclosed herein. In some examples, aspects of the operations of 1005 may be performed by a query receiver 525 as described with reference to FIG. 5.

At 1010, the method may include generating, via a LLM, one or more data queries from the natural language query, where the one or more data queries are configured to query one or more data sets of a set of multiple data sets. The operations of block 1010 may be performed in accordance with examples as disclosed herein. In some examples, aspects of the operations of 1010 may be performed by a data query generator 530 as described with reference to FIG. 5.

At 1015, the method may include transmitting the one or more data queries to the one or more data sets of the set of multiple data sets. The operations of block 1015 may be performed in accordance with examples as disclosed herein. In some examples, aspects of the operations of 1015 may be performed by a data query transmitter 535 as described with reference to FIG. 5.

At 1020, the method may include receiving, from the one or more data sets of the set of multiple data sets, information associated with the natural language query and a source for the information, where the source is indicative of a location within the one or more data sets from which the information is obtained. The operations of block 1020 may be performed in accordance with examples as disclosed herein. In some examples, aspects of the operations of 1020 may be performed by an information receiver 540 as described with reference to FIG. 5.

At 1025, the method may include generating, via the LLM, a response to the natural language query, where the response includes the information associated with the natural language query and the source for the information. The operations of block 1025 may be performed in accordance with examples as disclosed herein. In some examples, aspects of the operations of 1025 may be performed by a response generator 545 as described with reference to FIG. 5.

At 1030, the method may include performing, an encryption procedure on the sensitive data included within the information associated with the natural language query that is received from the one or more data queries to generate a set of encrypted information, where the response includes the information associated with the natural language query and the source for the information, and where the information includes the set of encrypted information. The operations of block 1030 may be performed in accordance with examples as disclosed herein. In some examples, aspects of the operations of 1030 may be performed by an encryption component 560 as described with reference to FIG. 5.

At 1035, the method may include transmitting, to the user interface, an authentication request prior to a transmission of the response to the user interface based on the information included in the response including the set of encrypted information. The operations of block 1035 may be performed in accordance with examples as disclosed herein. In some examples, aspects of the operations of 1035 may be performed by an authentication request transmitter 565 as described with reference to FIG. 5.

At 1040, the method may include transmitting, to the user interface for display, the response to the natural language query that includes the information and the source for the information. The operations of block 1040 may be performed in accordance with examples as disclosed herein. In some examples, aspects of the operations of 1040 may be performed by a response transmitter 550 as described with reference to FIG. 5.

A method for data processing by an apparatus is described. The method may include receiving, via a user interface, a natural language query, generating, via a LLM, one or more data queries from the natural language query, where the one or more data queries are configured to query one or more data sets of a set of multiple data sets, transmitting the one or more data queries to the one or more data sets of the set of multiple data sets, receiving, from the one or more data sets of the set of multiple data sets, information associated with the natural language query and a source for the information, where the source is indicative of a location within the one or more data sets from which the information is obtained, generating, via the LLM, a response to the natural language query, where the response includes the information associated with the natural language query and the source for the information, and transmitting, to the user interface for display, the response to the natural language query that includes the information and the source for the information.

An apparatus for data processing is described. The apparatus may include one or more memories storing processor executable code, and one or more processors coupled with the one or more memories. The one or more processors may individually or collectively operable to execute the code to cause the apparatus to receive, via a user interface, a natural language query, generate, via a LLM, one or more data queries from the natural language query, where the one or more data queries are configured to query one or more data sets of a set of multiple data sets, transmit the one or more data queries to the one or more data sets of the set of multiple data sets, receive, from the one or more data sets of the set of multiple data sets, information associated with the natural language query and a source for the information, where the source is indicative of a location within the one or more data sets from which the information is obtained, generate, via the LLM, a response to the natural language query, where the response includes the information associated with the natural language query and the source for the information, and transmit, to the user interface for display, the response to the natural language query that includes the information and the source for the information.

Another apparatus for data processing is described. The apparatus may include means for receiving, via a user interface, a natural language query, means for generating, via a LLM, one or more data queries from the natural language query, where the one or more data queries are configured to query one or more data sets of a set of multiple data sets, means for transmitting the one or more data queries to the one or more data sets of the set of multiple data sets, means for receiving, from the one or more data sets of the set of multiple data sets, information associated with the natural language query and a source for the information, where the source is indicative of a location within the one or more data sets from which the information is obtained, means for generating, via the LLM, a response to the natural language query, where the response includes the information associated with the natural language query and the source for the information, and means for transmitting, to the user interface for display, the response to the natural language query that includes the information and the source for the information.

A non-transitory computer-readable medium storing code for data processing is described. The code may include instructions executable by a processor to receive, via a user interface, a natural language query, generate, via a LLM, one or more data queries from the natural language query, where the one or more data queries are configured to query one or more data sets of a set of multiple data sets, transmit the one or more data queries to the one or more data sets of the set of multiple data sets, receive, from the one or more data sets of the set of multiple data sets, information associated with the natural language query and a source for the information, where the source is indicative of a location within the one or more data sets from which the information is obtained, generate, via the LLM, a response to the natural language query, where the response includes the information associated with the natural language query and the source for the information, and transmit, to the user interface for display, the response to the natural language query that includes the information and the source for the information.

In some examples of the method, apparatus, and non-transitory computer-readable medium described herein, generating the response may include operations, features, means, or instructions for generating the response that includes an inference related to data obtained from the one or more data sets via the one or more data queries, where the source for the information may be indicative of the location of the data that may be used for the inference by the LLM.

In some examples of the method, apparatus, and non-transitory computer-readable medium described herein, generating the one or more data queries may include operations, features, means, or instructions for parsing, via the LLM, the natural language query into one or more actionable queries, each one of the one or more actionable queries indicating a respective data set of the one or more data sets, where the one or more data queries may be generated based on the one or more actionable queries.

In some examples of the method, apparatus, and non-transitory computer-readable medium described herein, transmitting the response to the user interface for display may include operations, features, means, or instructions for transmitting, to the user interface for display, the response to the natural language query that includes the source for the information, where the source for the information may be displayed via the user interface as a footnote, a hyperlink, an in-line citation, or any combination thereof.

Some examples of the method, apparatus, and non-transitory computer-readable medium described herein may further include operations, features, means, or instructions for generating, via the LLM, a summary of the information associated with the natural language query that may be received from the one or more data queries, where the response includes the summary of the information and the source for the information that may be summarized.

In some examples of the method, apparatus, and non-transitory computer-readable medium described herein, the information associated with the natural language query that is received from the one or more data queries may include sensitive data and the method, apparatuses, and non-transitory computer-readable medium may include further operations, features, means, or instructions for performing, an encryption procedure on the sensitive data included within the information associated with the natural language query that may be received from the one or more data queries to generate a set of encrypted information, where the response includes the information associated with the natural language query and the source for the information, and where the information includes the set of encrypted information.

Some examples of the method, apparatus, and non-transitory computer-readable medium described herein may further include operations, features, means, or instructions for transmitting, to the user interface, an authentication request prior to a transmission of the response to the user interface based on the information included in the response including the set of encrypted information.

In some examples of the method, apparatus, and non-transitory computer-readable medium described herein, the one or more data sets may include one or more internal data sets, one or more external data sets, or any combination thereof.

In some examples of the method, apparatus, and non-transitory computer-readable medium described herein, the one or more internal data sets may be directly connected to the LLM and may include a customer relationship management platform, a multi-tenant database system, email archives for one or more tenants in the multi-tenant database system, public records of one or more tenants in the multi-tenant database system, or any combination thereof.

In some examples of the method, apparatus, and non-transitory computer-readable medium described herein, the one or more external data sets may be indirectly connected to the LLM and may include one or more public databases, online information references, data sets from public data providers, or any combination thereof.

The following provides an overview of aspects of the present disclosure:

Aspect 1: A method for data processing, comprising: receiving, via a user interface, a natural language query; generating, via a LLM, one or more data queries from the natural language query, wherein the one or more data queries are configured to query one or more data sets of a plurality of data sets; transmitting the one or more data queries to the one or more data sets of the plurality of data sets; receiving, from the one or more data sets of the plurality of data sets, information associated with the natural language query and a source for the information, wherein the source is indicative of a location within the one or more data sets from which the information is obtained; generating, via the LLM, a response to the natural language query, wherein the response comprises the information associated with the natural language query and the source for the information; and transmitting, to the user interface for display, the response to the natural language query that comprises the information and the source for the information.

Aspect 2: The method of aspect 1, wherein generating the response comprises: generating the response that includes an inference related to data obtained from the one or more data sets via the one or more data queries, wherein the source for the information is indicative of the location of the data that is used for the inference by the LLM.

Aspect 3: The method of any of aspects 1 through 2, wherein generating the one or more data queries further comprises: parsing, via the LLM, the natural language query into one or more actionable queries, each one of the one or more actionable queries indicating a respective data set of the one or more data sets, wherein the one or more data queries are generated based at least in part on the one or more actionable queries.

Aspect 4: The method of any of aspects 1 through 3, wherein transmitting the response to the user interface for display further comprises: transmitting, to the user interface for display, the response to the natural language query that comprises the source for the information, wherein the source for the information is displayed via the user interface as a footnote, a hyperlink, an in-line citation, or any combination thereof.

Aspect 5: The method of any of aspects 1 through 4, further comprising: generating, via the LLM, a summary of the information associated with the natural language query that is received from the one or more data queries, wherein the response comprises the summary of the information and the source for the information that is summarized.

Aspect 6: The method of any of aspects 1 through 5, wherein the information associated with the natural language query that is received from the one or more data queries comprises sensitive data and the method further comprises: performing, an encryption procedure on the sensitive data included within the information associated with the natural language query that is received from the one or more data queries to generate a set of encrypted information, wherein the response comprises the information associated with the natural language query and the source for the information, and wherein the information includes the set of encrypted information.

Aspect 7: The method of aspect 6, further comprising: transmitting, to the user interface, an authentication request prior to a transmission of the response to the user interface based at least in part on the information included in the response including the set of encrypted information.

Aspect 8: The method of any of aspects 1 through 7, wherein the one or more data sets may comprise one or more internal data sets, one or more external data sets, or any combination thereof.

Aspect 9: The method of aspect 8, wherein the one or more internal data sets may be directly connected to the LLM and may include a customer relationship management platform, a multi-tenant database system, email archives for one or more tenants in the multi-tenant database system, public records of one or more tenants in the multi-tenant database system, or any combination thereof.

Aspect 10: The method of any of aspects 8 through 9, wherein the one or more external data sets may be indirectly connected to the LLM and may include one or more public databases, online information references, data sets from public data providers, or any combination thereof.

Aspect 11: An apparatus for data processing, comprising one or more memories storing processor-executable code, and one or more processors coupled with the one or more memories and individually or collectively operable to execute the code to cause the apparatus to perform a method of any of aspects 1 through 10.

Aspect 12: An apparatus for data processing, comprising at least one means for performing a method of any of aspects 1 through 10.

Aspect 13: A non-transitory computer-readable medium storing code for data processing, the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, via a user interface, a natural language query;

parsing, via a large language model that is trained using a plurality of data sets, the natural language query into one or more actionable queries, wherein each one of the one or more actionable queries comprises an indication of a respective data set of the plurality of data sets and an indication of respective information to obtain from the respective data set;

generating, via the large language model and utilizing the one or more actionable queries, one or more data queries from the natural language query, generation of a respective data query of the one or more data queries comprising transforming a respective actionable query into the respective data query that is capable of interacting with the respective data set indicated via the respective actionable query to obtain the respective information included in the respective actionable query, wherein the generation of the one or more data queries to interact with respective data sets is based at least in part on the large language model being trained using the plurality of data sets;

transmitting the one or more data queries to one or more data sets of the plurality of data sets;

receiving, from the one or more data sets of the plurality of data sets and in response to the one or more data queries, information associated with the natural language query and a source for the information, the source being indicative of a location within the one or more data sets from which the information is obtained;

generating, via the large language model, a response to the natural language query, the response comprising an inference generated by the large language model that is based at least in part on the information associated with the natural language query obtained from the one or more data sets and the source for the information that the inference is based on, wherein the response is generated to comprise the source for the information that the inference is based on based at least in part on the large language model that generates the response being trained using the plurality of data sets; and transmitting, to the user interface for display, the response to the natural language query that comprises the inference of the information and the source for the information that the inference is based on.

2. The method of claim 1, wherein generating the response comprises:

generating the response that includes the inference related to data obtained from the one or more data sets via the one or more data queries, wherein the source for the information is indicative of the location of the data that is used for the inference by the large language model.

3. The method of claim 1, wherein transmitting the response to the user interface for the display further comprises:

transmitting, to the user interface for the display, the response to the natural language query that comprises the source for the information, wherein the source for the information is displayed via the user interface as a footnote, a hyperlink, an in-line citation, or any combination thereof.

4. The method of claim 1, further comprising:

generating, via the large language model and based at least in part on the large language model being trained using the plurality of data sets, a summary of the information associated with the natural language query that is received from the one or more data queries, wherein the response comprises the summary of the information and the source for the information that is summarized.

5. The method of claim 1, wherein the information associated with the natural language query that is received from the one or more data queries comprises sensitive data and the method further comprises:

performing, an encryption procedure on the sensitive data included within the information associated with the natural language query that is received from the one or more data queries to generate a set of encrypted information, wherein the response comprises the information associated with the natural language query and the source for the information, and wherein the information includes the set of encrypted information.

6. The method of claim 5, further comprising:

transmitting, to the user interface, an authentication request prior to a transmission of the response to the user interface based at least in part on the information included in the response including the set of encrypted information.

7. The method of claim 1, wherein the one or more data sets may comprise one or more internal data sets, one or more external data sets, or any combination thereof.

8. The method of claim 7, wherein the one or more internal data sets may be directly connected to the large language model and may include a customer relationship management platform, a multi-tenant database system, email archives for one or more tenants in the multi-tenant database system, public records of the one or more tenants in the multi-tenant database system, or any combination thereof.

9. The method of claim 7, wherein the one or more external data sets may be indirectly connected to the large language model and may include one or more public databases, online information references, data sets from public data providers, or any combination thereof.

10. An apparatus for data processing, comprising:

one or more memories storing processor-executable code; and one or more processors coupled with the one or more memories and individually or collectively operable to execute the code to cause the apparatus to:

receive, via a user interface, a natural language query;

parse, via a large language model that is trained using a plurality of data sets, the natural language query into one or more actionable queries, wherein each one of the one or more actionable queries comprises an indication of a respective data set of the plurality of data sets and an indication of respective information to obtain from the respective data set;

generate, via the large language model and utilizing the one or more actionable queries, one or more data queries from the natural language query, generation of a respective data query of the one or more data queries comprising transforming a respective actionable query into the respective data query that is capable of interacting with the respective data set indicated via the respective actionable query to obtain the respective information included in the respective actionable query, wherein the generation of the one or more data queries to interact with respective data sets is based at least in part on the large language model being trained using the plurality of data sets;

transmit the one or more data queries to one or more data sets of the plurality of data sets;

receive, from the one or more data sets of the plurality of data sets and in response to the one or more data queries, information associated with the natural language query and a source for the information, the source being indicative of a location within the one or more data sets from which the information is obtained;

generate, via the large language model, a response to the natural language query, the response comprising an inference generated by the large language model that is based at least in part on the information associated with the natural language query obtained from the one or more data sets and the source for the information that the inference is based on, wherein the response is generated to comprise the source for the information that the inference is based on based at least in part on the large language model that generates the response being trained using the plurality of data sets; and transmit, to the user interface for display, the response to the natural language query that comprises the inference of the information and the source for the information that the inference is based on.

11. The apparatus of claim 10, wherein, to generate the response, the one or more processors are individually or collectively operable to execute the code to cause the apparatus to:

generate the response that includes the inference related to data obtained from the one or more data sets via the one or more data queries, wherein the source for the information is indicative of the location of the data that is used for the inference by the large language model.

12. The apparatus of claim 10, wherein, to transmit the response to the user interface for the display, the one or more processors are individually or collectively further operable to execute the code to cause the apparatus to:

transmit, to the user interface for the display, the response to the natural language query that comprises the source for the information, wherein the source for the information is displayed via the user interface as a footnote, a hyperlink, an in-line citation, or any combination thereof.

13. The apparatus of claim 10, wherein the one or more processors are individually or collectively further operable to execute the code to cause the apparatus to:

generate, via the large language model and based at least in part on the large language model being trained using the plurality of data sets, a summary of the information associated with the natural language query that is received from the one or more data queries, wherein the response comprises the summary of the information and the source for the information that is summarized.

14. A non-transitory computer-readable medium storing code for data processing, the code comprising instructions executable by one or more processors to:

receive, via a user interface, a natural language query;

parse, via a large language model that is trained using a plurality of data sets, the natural language query into one or more actionable queries, wherein each one of the one or more actionable queries comprises an indication of a respective data set of the plurality of data sets and an indication of respective information to obtain from the respective data set;

generate, via the large language model and utilizing the one or more actionable queries, one or more data queries from the natural language query, generation of a respective data query of the one or more data queries comprising transforming a respective actionable query into the respective data query that is capable of interacting with the respective data set indicated via the respective actionable query to obtain the respective information included in the respective actionable query, wherein the generation of the one or more data queries to interact with respective data sets is based at least in part on the large language model being trained using the plurality of data sets;

transmit the one or more data queries to one or more data sets of the plurality of data sets;

receive, from the one or more data sets of the plurality of data sets and in response to the one or more data queries, information associated with the natural language query and a source for the information, the source being indicative of a location within the one or more data sets from which the information is obtained;

generate, via the large language model, a response to the natural language query, the response comprising an inference generated by the large language model that is based at least in part on the information associated with the natural language query obtained from the one or more data sets and the source for the information that the inference is based on, wherein the response is generated to comprise the source for the information that the inference is based on based at least in part on the large language model that generates the response being trained using the plurality of data sets; and transmit, to the user interface for display, the response to the natural language query that comprises the inference of the information and the source for the information that the inference is based on.

15. The non-transitory computer-readable medium of claim 14, wherein the instructions to generate the response are executable by the one or more processors to:

generate the response that includes the inference related to data obtained from the one or more data sets via the one or more data queries, wherein the source for the information is indicative of the location of the data that is used for the inference by the large language model.

16. The non-transitory computer-readable medium of claim 14, wherein the instructions to transmit the response to the user interface for the display are further executable by the one or more processors to:

transmit, to the user interface for the display, the response to the natural language query that comprises the source for the information, wherein the source for the information is displayed via the user interface as a footnote, a hyperlink, an in-line citation, or any combination thereof.

17. The non-transitory computer-readable medium of claim 14, wherein the instructions are further executable by the one or more processors to:

generate, via the large language model and based at least in part on the large language model being trained using the plurality of data sets, a summary of the information associated with the natural language query that is received from the one or more data queries, wherein the response comprises the summary of the information and the source for the information that is summarized.

* * * * *